(12) United States Patent
Kodama

(10) Patent No.: US 11,787,238 B2
(45) Date of Patent: Oct. 17, 2023

(54) PNEUMATIC TIRE

(71) Applicant: The Yokohama Rubber Co., LTD., Tokyo (JP)

(72) Inventor: Yuji Kodama, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 69 days.

(21) Appl. No.: 17/044,852

(22) PCT Filed: Mar. 11, 2019

(86) PCT No.: PCT/JP2019/009610
§ 371 (c)(1),
(2) Date: Oct. 1, 2020

(87) PCT Pub. No.: WO2019/193931
PCT Pub. Date: Oct. 10, 2019

(65) Prior Publication Data
US 2021/0146732 A1 May 20, 2021

(30) Foreign Application Priority Data
Apr. 2, 2018 (JP) ................................ 2018-071015

(51) Int. Cl.
*B60C 13/02* (2006.01)
(52) U.S. Cl.
CPC .................................. *B60C 13/02* (2013.01)
(58) Field of Classification Search
CPC .............................. B60C 13/02; B60C 13/023
(Continued)

(56) References Cited

U.S. PATENT DOCUMENTS 5,259,431 A 11/1993 Housiaux
2010/0193102 A1 8/2010 Tsuruta et al.
(Continued)

FOREIGN PATENT DOCUMENTS

JP 2001-039129 2/2001
JP 2006168499 A * 6/2006
(Continued)

OTHER PUBLICATIONS

Air—Absolute and Kinematic Viscosity, The Engineering Tool Box, May 8, 2006, <https://web.archive.org/web/20060508165643/https://www.engineeringtoolbox.com/air-absolute-kinematic-viscosity-d_601.html.> (Year: 2022).*
(Continued)

*Primary Examiner* — Robert C Dye
*Assistant Examiner* — Alexander D Booth
(74) *Attorney, Agent, or Firm* — THORPE NORTH & WESTERN

(57) ABSTRACT

A pneumatic tire includes a plurality of protrusion portions extending along a tire side surface of a tire side portion longitudinally intersecting a tire circumferential direction or a tire radial direction and being provided at intervals in the tire circumferential direction, and each of the protrusion portions includes an external contour that includes a plurality of main external contour portions having different curvatures, and a connection portion connecting between the main external contour portions, the external contour projecting from the tire side surface in a cross-sectional shape in a longitudinal direction.

25 Claims, 20 Drawing Sheets

(58) Field of Classification Search
USPC .......................................................... 152/523
See application file for complete search history.

(56) References Cited

U.S. PATENT DOCUMENTS

| | | | | |
|---|---|---|---|---|
| 2010/0294412 | A1* | 11/2010 | Inoue | ...................... B60C 13/02 |
| | | | | 152/523 |
| 2012/0073719 | A1* | 3/2012 | Kurosawa | ............. B60C 13/002 |
| | | | | 152/523 |
| 2012/0097304 | A1 | 4/2012 | Kojima et al. | |
| 2013/0014877 | A1 | 1/2013 | Ahn et al. | |
| 2015/0360521 | A1 | 12/2015 | Kojima et al. | |
| 2016/0001608 | A1* | 1/2016 | Abdallah, Jr. | ...... B60C 15/0242 |
| | | | | 152/523 |
| 2018/0086156 | A1* | 3/2018 | Kodama | ................ B60C 13/00 |
| 2018/0297418 | A1 | 10/2018 | Kodama | |
| 2020/0231011 | A1 | 7/2020 | Sekine et al. | |

FOREIGN PATENT DOCUMENTS

| | | |
|---|---|---|
| JP | 2009-029381 | 2/2009 |
| JP | 2010-260378 | 11/2010 |
| JP | 2012-066731 | 4/2012 |
| JP | 2013-018474 | 1/2013 |
| JP | 2013-159233 | 8/2013 |
| JP | 2013159233 A * | 8/2013 |
| JP | 2014-076769 | 5/2014 |
| JP | 2015-212117 | 11/2015 |
| JP | 2019-038516 | 3/2019 |
| WO | WO 2009/017165 | 2/2009 |
| WO | WO 2016/181928 | 11/2016 |
| WO | WO 2016/181934 | 11/2016 |
| WO | WO 2017/056976 | 4/2017 |

OTHER PUBLICATIONS

ESpaceNet Translation of JP2015212117 (Year: 2022).*
ESpaceNet Translation of JP2013159233A (Year: 2022).*
ESpaceNet Translation of JP2006168499A (Year: 2022).*
International Search Report for International Application No. PCT/JP2019/009610 dated Jun. 11, 2019, 4 pages, Japan.

* cited by examiner

| | Conventional example | Example 1 | Example 2 | Example 3 | Example 4 | Example 5 | Example 6 | Example 7 | Example 8 |
|---|---|---|---|---|---|---|---|---|---|
| External contour of protrusion portion includes main external contour portions and connection portion | Poor | Good | Good | Good | Good | Good | Good | Good | Good |
| External contour is along ridge line of protrusion portion | - | Good | Poor | Good | Good | Good | Good | Good | Good |
| External contour is along surface of protrusion portion | - | Poor | Good | Good | Poor | Poor | Poor | Poor | Poor |
| Range y from each end in longitudinal direction (L×y) | - | 0.03 | 0.03 | 0.03 | 0.05 | 0.05 | 0.1 | 0.05 | 0.05 |
| Range z of main external contour portion (L×z) | - | 0.3 | 0.3 | 0.3 | 0.3 | 0.9 | 0.8 | 0.8 | 0.8 |
| Range v of connection portion (L×v) | - | 0.64 | 0.64 | 0.64 | 0.6 | 0 | 0 | 0.1 | 0.1 |
| Reynolds number Re (primary flow velocity (27.8 m/s9)) | 1900 | 1900 | 1900 | 1900 | 1900 | 1900 | 1900 | 2000 | 400000 |
| Total constant volume Vo mm³ of protrusion portions in range of Reynolds number Re | 900 | 900 | 900 | 900 | 900 | 900 | 900 | 900 | 900 |
| Height of highest position of projection height mm | 1.5 | 1.5 | 1.5 | 1.5 | 1.5 | 1.5 | 1.5 | 1.5 | 1.5 |
| Air-resistance-reducing performance | 100 | 100.3 | 100.3 | 100.5 | 100.3 | 100.3 | 100.3 | 100.5 | 100.5 |
| Lift-reducing performance | 100 | 100.3 | 100.3 | 100.5 | 100.3 | 100.3 | 100.3 | 100.5 | 100.5 |

FIG. 30A

| | Example 9 | Example 10 | Example 11 | Example 12 | Example 13 | Example 14 | Example 15 | Example 16 | Example 17 |
|---|---|---|---|---|---|---|---|---|---|
| External contour of protrusion portion includes main external contour portions and connection portion | Good | Good | Good | Good | Good | Good | Good | Good | Good |
| External contour is along ridge line of protrusion portion | Good | Good | Good | Good | Good | Good | Good | Poor | Good |
| External contour is along surface of protrusion portion | Poor | Poor | Poor | Poor | Poor | Poor | Poor | Good | Good |
| Range y from each end in longitudinal direction (L×y) | 0.05 | 0.05 | 0.05 | 0.05 | 0.05 | 0.05 | 0.05 | 0.05 | 0.05 |
| Range z of main external contour portion (L×z) | 0.8 | 0.8 | 0.8 | 0.8 | 0.8 | 0.8 | 0.8 | 0.8 | 0.8 |
| Range v of connection portion (L×v) | 0.1 | 0.1 | 0.1 | 0.1 | 0.1 | 0.1 | 0.1 | 0.1 | 0.1 |
| Reynolds number Re (primary flow velocity (27.8 m/s9)) | 200000 | 200000 | 200000 | 200000 | 200000 | 200000 | 200000 | 200000 | 200000 |
| Total constant volume Vo mm³ of protrusion portions in range of Reynolds number Re | 900 | 1000 | 50000 | 10000 | 10000 | 10000 | 10000 | 10000 | 10000 |
| Height of highest position of projection height mm | 1.5 | 1.5 | 1.5 | 1.5 | 2.0 | 10.0 | 6.0 | 6.0 | 6.0 |
| Air-resistance-reducing performance | 101 | 101 | 101 | 101 | 102 | 101 | 102 | 102 | 103 |
| Lift-reducing performance | 101 | 102 | 103 | 103 | 104 | 105 | 105 | 105 | 105 |

FIG. 30B

PNEUMATIC TIRE

TECHNICAL FIELD

The present technology relates to a pneumatic tire.

BACKGROUND ART

In the related art, for example, Japan Unexamined Patent Publication No. 2010-260378 discloses a pneumatic tire in which, when mounted on a vehicle, a large number of protrusion portions (protruding portions) extending in the tire radial direction are provided at predetermined intervals in the tire circumferential direction on a tire side portion (tire outer surface) on the inner side in the width direction of the vehicle. In this pneumatic tire, flow of air around the tire when driving can be promoted, so that the air resistance in high speed driving conditions can be effectively reduced.

In addition, in the related art, for example, Japan Unexamined Patent Publication No. 2013-018474 describes a vehicle tire that includes a sidewall on which curved projection portions are formed. Japan Unexamined Patent Publication No. 2013-018474 describes that a flow of air against the sidewall does not naturally pass along the sidewall, but moves inside a wheel housing of the vehicle, thereby generating a downforce that presses down the upper end of a tread of the tire. Note that by the downforce being generated, lift, a force that lifts the vehicle upwards, is reduced.

As described in Japan Unexamined Patent Publication No. 2010-260378, while it is known that the air resistance when driving is reduced by providing the protrusion portions on the tire side portion, there is a demand for a further air resistance reduction effect with improved performance of a vehicle.

SUMMARY

The present technology provides a pneumatic tire that can further improve the air resistance reduction effect.

A pneumatic tire according to an aspect of the present technology includes a plurality of protrusion portions extending along a tire side surface of a tire side portion longitudinally intersecting a tire circumferential direction or a tire radial direction and are provided at intervals in the tire circumferential direction, and each of the protrusion portions have an external contour that includes a plurality of main external contours having different curvatures, and a connection portion connecting between the main external contour portions, the external contour projecting from the tire side surface in a cross-sectional shape along a longitudinal direction.

In a pneumatic tire according to an aspect of the present technology, preferably the external contour is formed along a ridge line of the protrusion portion.

In a pneumatic tire according to an aspect of the present technology, preferably the external contour is formed along a surface of the protrusion portion.

Additionally, in a pneumatic tire according to an aspect of the present technology, preferably the external contour has the plurality of main external contour portions and the connection portion formed in a range excluding a range of from each of ends in the longitudinal direction to (L×0.05) with respect to a dimension L of the protrusion portion in the longitudinal direction.

Additionally, in a pneumatic tire according to an aspect of the present technology, preferably the external contour has the plurality of main external contour portions formed in a range from (L×0.7) to (L×0.9), and the connection portion formed in a range of (L×0) to (L×0.3) with respect to the dimension L of the protrusion portion in the longitudinal direction.

Additionally, in a pneumatic tire according to an aspect of the present technology, when the pneumatic tire is incorporated into a regular rim, inflated to a regular internal pressure, ground to a road surface that is a horizontal surface with a regular load, and rolling on the road surface, in a case where a relative speed U between the tire side portion and the road surface is expressed by U [m/s]=V×r/Q and a Reynolds number Re is expressed by Re=U×Q/v where V is a primary flow velocity [m/s] opposite to a rolling direction of the pneumatic tire, r is a distance [m] from the road surface toward the rotation axis, Q is a distance [m] from the road surface to the rotation axis, and v is a kinematic viscosity of air [m²/s], and the primary flow velocity V [m/s] is 27.8, the protrusion portion is preferably provided at a position where a range of the Reynolds number Re satisfies $2000 < Re < 4 \times 10^5$.

Additionally, in a pneumatic tire according to an aspect of the present technology, a total volume Vo of the protrusion portions preferably satisfies a range of $1000 \text{ [mm}^3\text{]} \le Vo \le 50000 \text{ [mm}^3\text{]}$ in the range of Reynolds number Re.

In a pneumatic tire according to an aspect of the present technology, preferably each of the protrusion portions has a highest position of a projection height from the tire side surface of 2 mm or higher and 10 mm or lower.

In a pneumatic tire according an aspect of the present technology, a variation in projection height of each of the protrusion portions per 1 degree in the tire circumferential direction is preferably 1 mm/deg or less.

In a pneumatic tire according an aspect of the present technology, a variation in mass of each of the protrusion portions per 1 degree in the tire circumferential direction is preferably 0.1 g/deg or less.

In a pneumatic tire according to an aspect of the present technology, the plurality of protrusion portions are preferably disposed at non-uniform intervals in the tire circumferential direction.

Furthermore, in a pneumatic tire according to an aspect of the present technology, preferably, a vehicle inner/outer side orientation when the pneumatic tire is mounted on a vehicle is designated, and the plurality of protrusion portions are formed on at least the tire side portion corresponding to an outer side of the vehicle.

According to the present technology, since the external contour of the protrusion portion includes a plurality of main external contour portions having different curvatures, and a connection portion that connects the main external contour portions, the flows of air along the main external contour portions having different curvatures collide with each other at the position of the connection portion to generate a vortex using the connection portion as a starting point, thereby assisting generation of a turbulent flow boundary layer by the protrusion portions. As a result, the flow of air in the pneumatic tire is further promoted and a bulge of air separating away from the vehicle on the outer side of the tire housing is further suppressed, so that the effect of reducing the air resistance generated in the vehicle can be improved.

BRIEF DESCRIPTION OF DRAWINGS

FIGS. 30A-30B include a table showing results of performance tests of pneumatic tires according to examples of the present technology.

DETAILED DESCRIPTION

Embodiments of the present technology are described in detail below with reference to the drawings. However, the present technology is not limited by the embodiment. Constituents of the embodiment include elements that are essentially identical or that can be substituted or easily conceived by one skilled in the art. Furthermore, the plurality of modified examples described in the embodiment can be combined as desired within the scope apparent to one skilled in the art.

Figure 1:
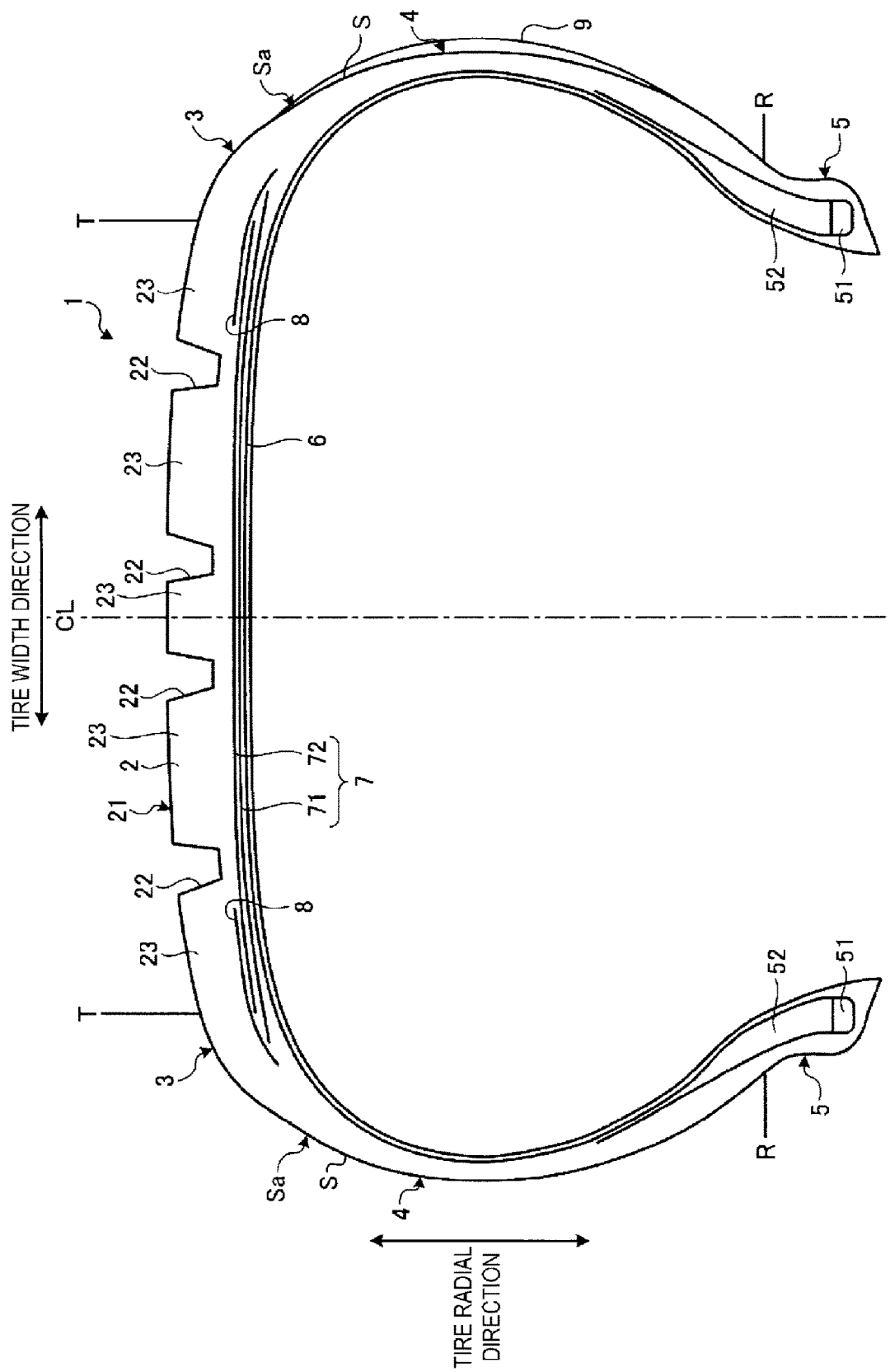
FIG. 1 is a meridian cross-sectional view of a pneumatic tire according to an embodiment of the present technology.

FIG. 1 is a meridian cross-sectional view of a pneumatic tire according to the present embodiment.

In the following description, "tire radial direction" refers to the direction orthogonal to the rotation axis P (see FIG. 2) of a pneumatic tire 1. "Inward in the tire radial direction" refers to the direction toward the rotation axis P in the tire radial direction. "Outward in the tire radial direction" refers to the direction away from the rotation axis P in the tire radial direction. "Tire circumferential direction" refers to the circumferential direction with the rotation axis P as the center axis. Additionally, "tire width direction" refers to the direction parallel with the rotation axis P. "Inward in the tire width direction" refers to the direction toward a tire equatorial plane (tire equator line) CL in the tire width direction. "Outward in the tire width direction" refers to the direction away from the tire equatorial plane CL in the tire width direction. "Tire equatorial plane CL" refers to a plane that is orthogonal to the rotation axis P of the pneumatic tire 1 and that passes through a center of a tire width of the pneumatic tire 1. "Tire width" is the width in the tire width direction between components located on outer sides in the tire width direction, or in other words, the distance between the components that are the most distant from the tire equatorial plane CL in the tire width direction. "Tire equator line" refers to the line in the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the pneumatic tire 1 includes a tread portion 2, shoulder portions 3 on opposite sides of the tread portion 2, and sidewall portions 4 and bead portions 5 continuing from the shoulder portions 3 in this order. Additionally, the pneumatic tire 1 includes a carcass layer 6, a belt layer 7, and a belt reinforcing layer 8.

The tread portion 2 is made of a rubber material (tread rubber) and is exposed on the outermost side of the pneumatic tire 1 in the tire radial direction, with the surface thereof constituting the contour of the pneumatic tire 1. A tread surface 21 is formed on an outer circumferential surface of the tread portion 2, in other words, on a road contact surface that comes into contact with a road surface when running. The tread surface 21 is provided with a plurality (four in the present embodiment) of main grooves 22 that are straight main grooves extending in the tire circumferential direction parallel with the tire equator line CL. Moreover, a plurality of rib-like land portions 23 extending in the tire circumferential direction and parallel with the tire equator line CL are formed in the tread surface 21 by the plurality of main grooves 22. Additionally, while not illustrated in the drawings, lug grooves that meet with the main grooves 22 in each of the land portions 23 are provided in the tread surface 21. The land portions 23 are divided into a plurality of segments in the tire circumferential direction by the lug grooves. Additionally, the lug grooves are formed on the outermost side of the tread portion 2 in the tire width direction so as to open outward in the tire width direction of the tread portion 2. Note that the lug grooves may have a form that communicates with the main grooves 22 or may have a form that does not communicate with the main grooves 22.

The shoulder portions 3 are portions of the tread portion 2 located on both outer sides in the tire width direction. Additionally, the sidewall portions 4 are exposed on the outermost sides of the pneumatic tire 1 in the tire width direction. The bead portions 5 each include a bead core 51 and a bead filler 52. The bead core 51 is formed by winding a bead wire, which is a steel wire, into an annular shape. The bead filler 52 is a rubber material that is disposed in the space formed by an end portion of the carcass layer 6 in the tire width direction being folded back at the position of the bead core 51.

The end portions of the carcass layer 6 in the tire width direction are folded back around the pair of bead cores 51 from an inner side to an outer side in the tire width direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of organic fibers (e.g., polyester, rayon, nylon, and the like). The carcass layer 6 is provided with at least one layer.

The belt layer 7 has a multilayer structure in which at least two belts 71, 72 are layered. In the tread portion 2, the belt layer 7 is disposed outward of the carcass layer 6 in the tire radial direction, i.e. on the outer circumference thereof, and covers the carcass layer 6 in the tire circumferential direction. The belts 71, 72 are made of coating rubber-covered cords (not illustrated) disposed side by side at a predetermined angle with respect to the tire circumferential direction (for example, from 20° to 30°). The cords are made of steel or organic fibers (polyester, rayon, nylon, or the like). Moreover, the belts 71, 72 overlap each other and are disposed so that the direction of the cords of the respective belts intersect each other.

The belt reinforcing layer 8 is disposed on the outer side of the belt layer 7 in the tire radial direction, i.e. on the outer circumference thereof, and covers the belt layer 7 in the tire circumferential direction. The belt reinforcing layer 8 is made of coating rubber-covered cords (not illustrated) disposed side by side in the tire width direction substantially parallel) (±5°) to the tire circumferential direction. The cords are made of steel or organic fibers (polyester, rayon, nylon, or the like). The belt reinforcing layer 8 illustrated in FIG. 1 is disposed so as to cover end portions of the belt layer 7 in the tire width direction. The configuration of the belt reinforcing layer 8 is not limited to that described above. Although not illustrated in the drawings, a configuration may be used in which the belt reinforcing layer 8 is disposed so as to cover the entire belt layer 7. Alternatively, for example, a configuration with two reinforcing layers may be used, in which the inner reinforcing layer in the tire radial direction is formed larger than the belt layer 7 in the tire width direction so as to cover the entire belt layer 7, and the outer reinforcing layer in the tire radial direction is disposed so as to only cover the end portions of the belt layer 7 in the tire width direction. In another example, a configuration with two reinforcing layers may be used, in which both of the reinforcing layers are disposed so as to only cover the end portions of the belt layer 7 in the tire width direction. In other words, the belt reinforcing layer 8 overlaps with at least the end portion of the belt layer 7 in the tire width direction. Additionally, the belt reinforcing layer 8 is configured by winding a band-like (e.g. with a width of 10 mm) strip material in the tire circumferential direction.

Figure 2:
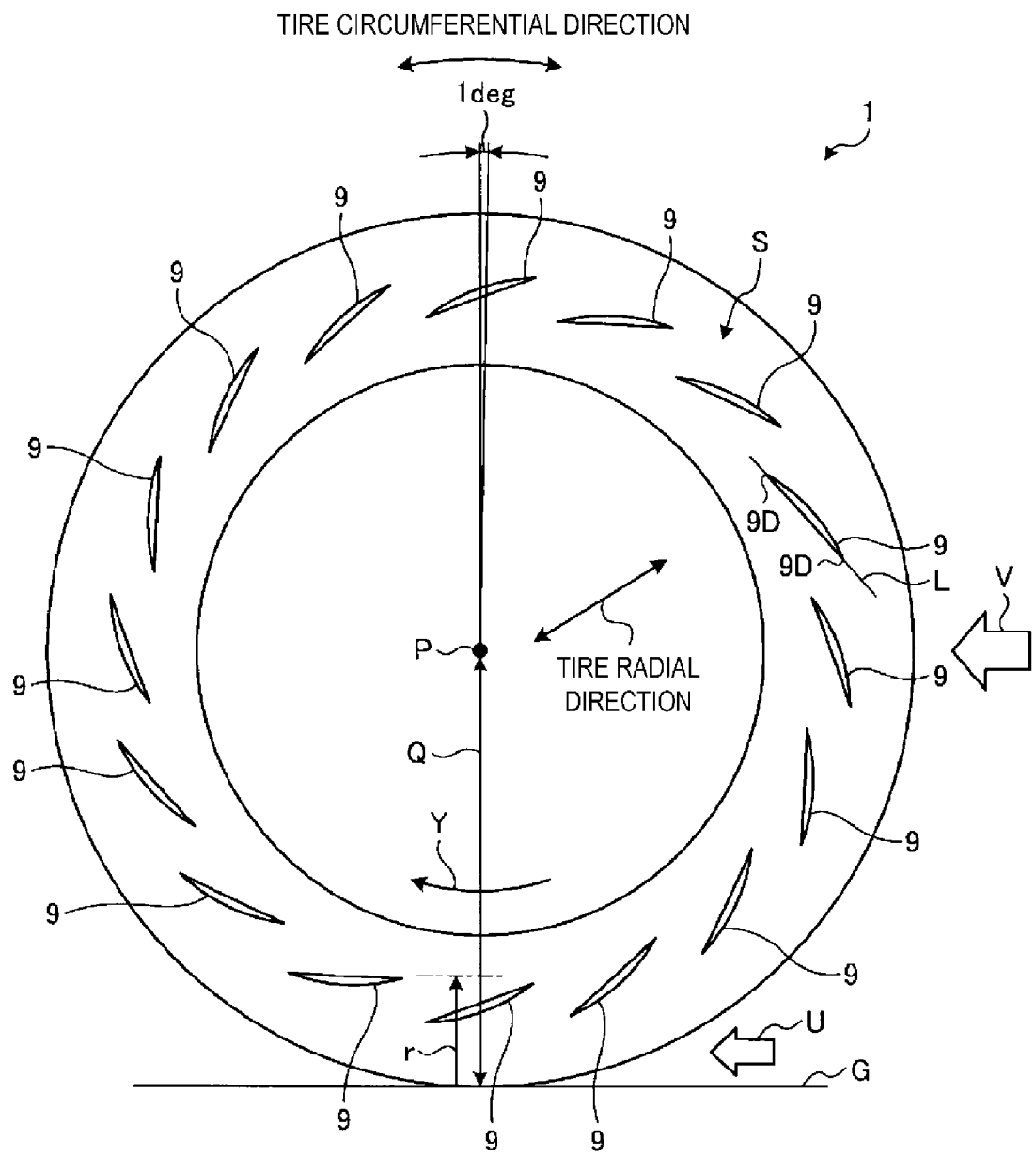
FIG. 2 is a side view of a pneumatic tire according to an embodiment of the present technology.

FIG. 2 is a side view of a pneumatic tire according to the present embodiment. FIGS. 3 to 8 are cross-sectional views of a protrusion portion in the longitudinal direction. FIGS. 9 to 14 are cross-sectional views of a protrusion portion in the lateral direction.

In the following description, as illustrated in FIG. 1, "tire side portion S" refers to a surface that uniformly continues from a ground contact edge T of the tread portion 2 outward in the tire width direction, or, in other words, a range from a rim check line R outward in the tire radial direction. Additionally, "ground contact edge T" refers to both outermost edges in the tire width direction in a region in which the tread surface 21 of the tread portion 2 of the pneumatic tire 1 contacts the road surface (horizontal surface) with the pneumatic tire 1 incorporated in a regular rim, inflated to a regular internal pressure, and loaded with 70% of a regular load. The both outermost edges are continuous in the tire circumferential direction. Moreover, "rim check line R" refers to a line used to confirm whether the tire has been mounted on the rim correctly and, typically, is an annular convex line closer to the outer side in the tire radial direction than a rim flange and continues in the tire circumferential direction along a portion approximate to the rim flange on a front side surface of the bead portions 5.

Note that the "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

In the pneumatic tire 1 of the present embodiment, as illustrated in FIGS. 1 and 2, a protrusion portion 9 is provided on at least one tire side portion S, the protrusion portion 9 projecting outward beyond a tire side surface Sa that corresponds to the profile of the surface of the tire side portion S. The protrusion portion 9 is made of a rubber material (the same rubber material as that constituting the tire side portion S or a different rubber material) and formed as a ridge that extends along the tire side surface Sa of the tire side portion S longitudinally in a direction that intersects the tire circumferential direction or the tire radial direction. As illustrated in FIG. 2, the extension direction (longitudinal direction) is a straight line L connecting ends 9D. The protrusion portion 9 is formed so that the extension direction (longitudinal direction) represented by the straight line L intersects with the tire circumferential direction and the tire radial direction as illustrated in FIG. 2. However, although not illustrated in the drawings, the protrusion portion 9 may be formed so that the extension direction only intersects the tire radial direction as a tangent line along the tire circumferential direction, or only intersects the tire circumferential direction along the tire radial direction. A plurality of the protrusion portions 9 are disposed in the tire circumferential direction.

In the present embodiment, for example, as illustrated in FIG. 2, the protrusion portion 9 extends in the extension direction (longitudinal direction) when viewed from the side of the pneumatic tire 1 and curve in a C-shape. The protrusion portion 9 is not limited to being curved and may be linear in the extension direction (longitudinal direction) when viewed from the side of the pneumatic tire 1, may be formed in a V-shape, may be formed in a S-shape, may have meandering configuration, or may be formed in a zigzag shape. Furthermore, in any configuration, the extension direction (longitudinal direction) is a straight line L connecting the ends 9D.

In the cross-sectional shape along the longitudinal direction illustrated in FIGS. 3 to 8, in the protrusion portion 9, an external contour 9P projecting from the tire side surface Sa outward the tire includes a plurality of main external contour portions $9P_1$ having different curvatures so as to form an external contour primarily between the ends 9D, and a connection portion $9P_2$ connecting the main external contour portions $9P_1$ formed. FIGS. 3 to 8 are schematic diagrams illustrating the tire side surface Sa in a plane, and the external contour 9P as having two main external contour portions $9P_1$ and a connection portion $9P_2$ connecting the two. In the pneumatic tire 1 of the present embodiment, although not illustrated in the drawings, there is included a configuration in which the external contour 9P has three or more main external contour portion $9P_1$ and two or more connection portions $9P_2$ connecting the main external contour portions $9P_1$.

Figure 3:
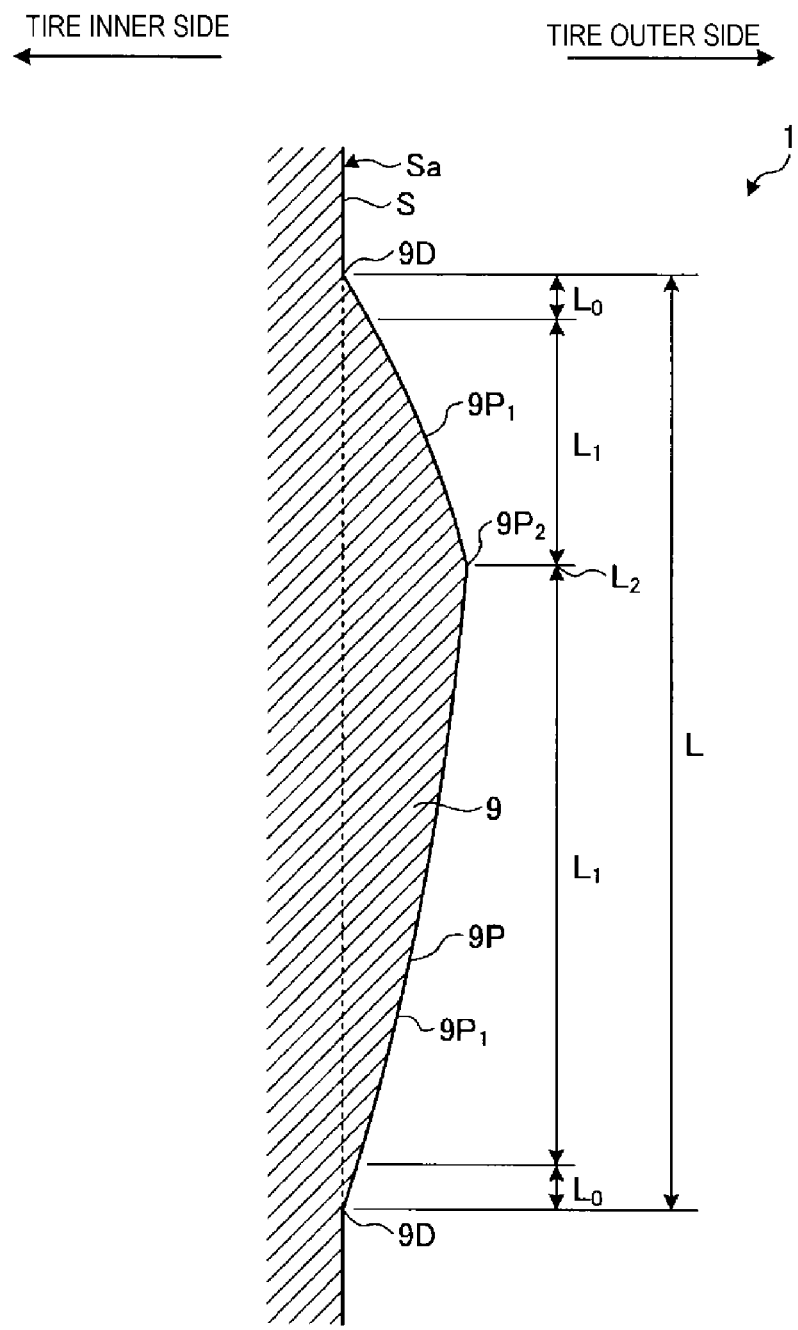
FIG. 3 is a cross-sectional view of a protrusion portion in the longitudinal direction.
Figure 4:
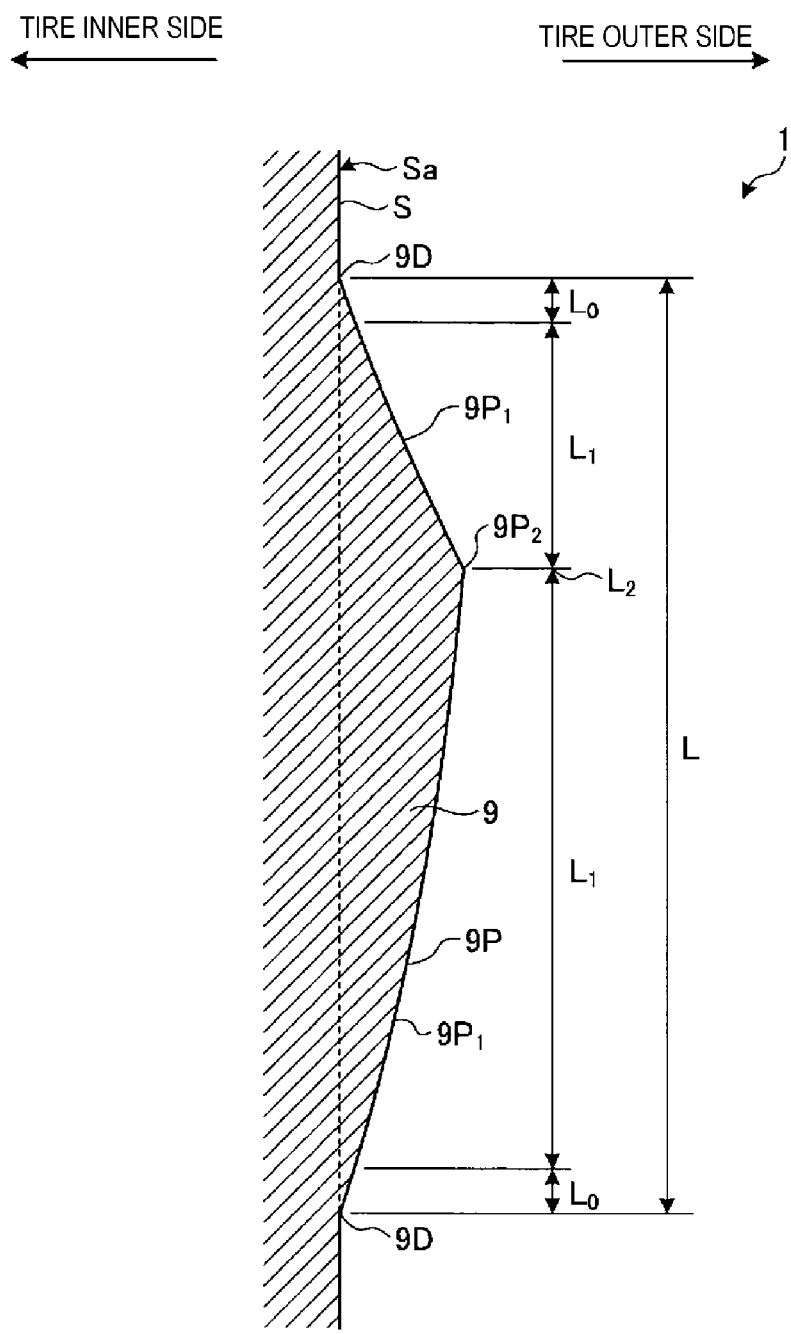
FIG. 4 is a cross-sectional view of a protrusion portion of another example in the longitudinal direction.

The main external contour portions $9P_1$ each are formed along a curvature circle having any curvature. The main external contour portions $9P_1$ each include a straight line having a curvature of 0. As illustrated in FIG. 3, the main external contour portions $9P_1$ each form a curvature circle whose center is disposed closer to the tire inner side than the tire side surface Sa, the curvature circle bulging toward the outer side of the tire. Also, as illustrated in FIG. 4, in the main external contour portions $9P_1$ with the connection portion $9P_2$ interposed therebetween, at least one of the main external contour portions $9P_1$ in the longitudinal direction may form a curvature circle whose center is disposed closer to the outer side of the tire than the tire side surface Sa, the curvature circle being dented toward the inner side of the tire.

Figure 5:
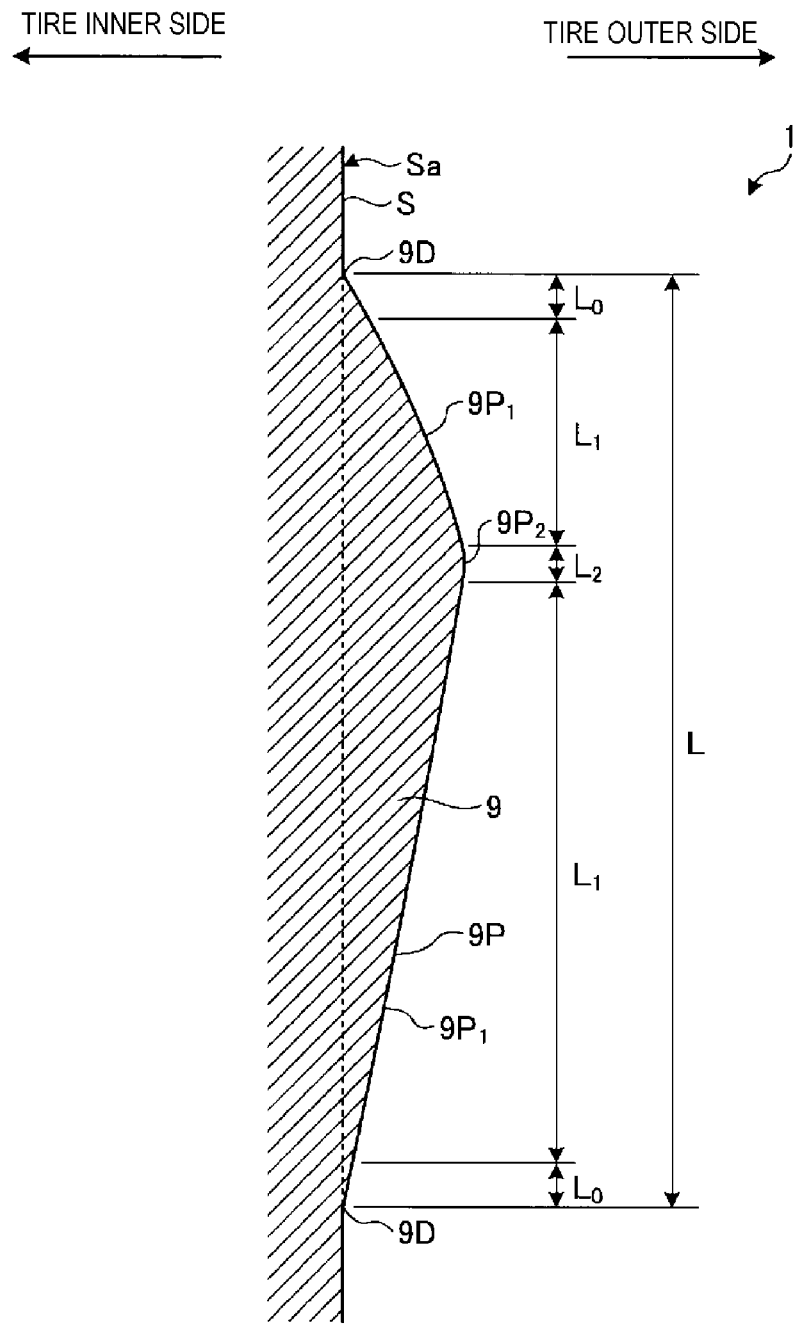
FIG. 5 is a cross-sectional view of a protrusion portion of another example in the longitudinal direction.
Figure 6:
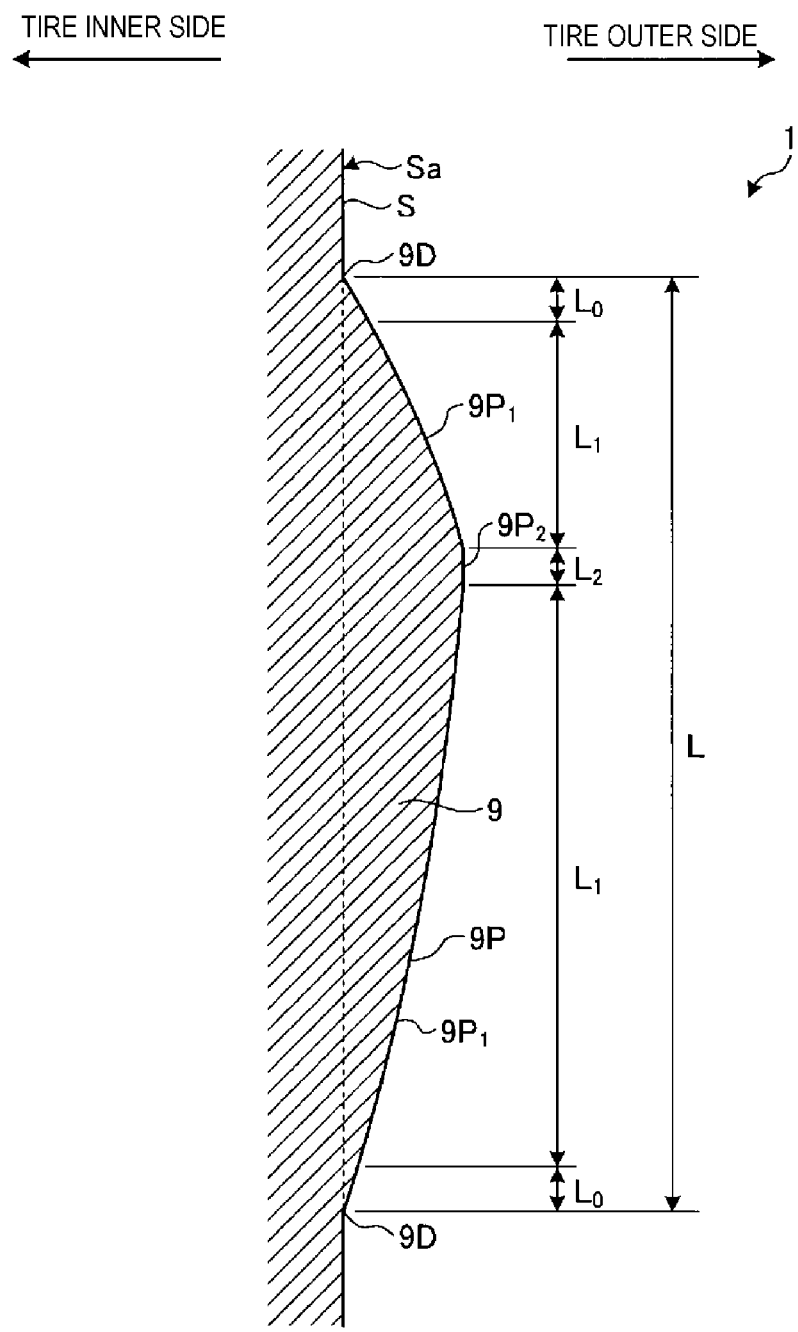
FIG. 6 is a cross-sectional view of a protrusion portion of another example in the longitudinal direction.
Figure 7:
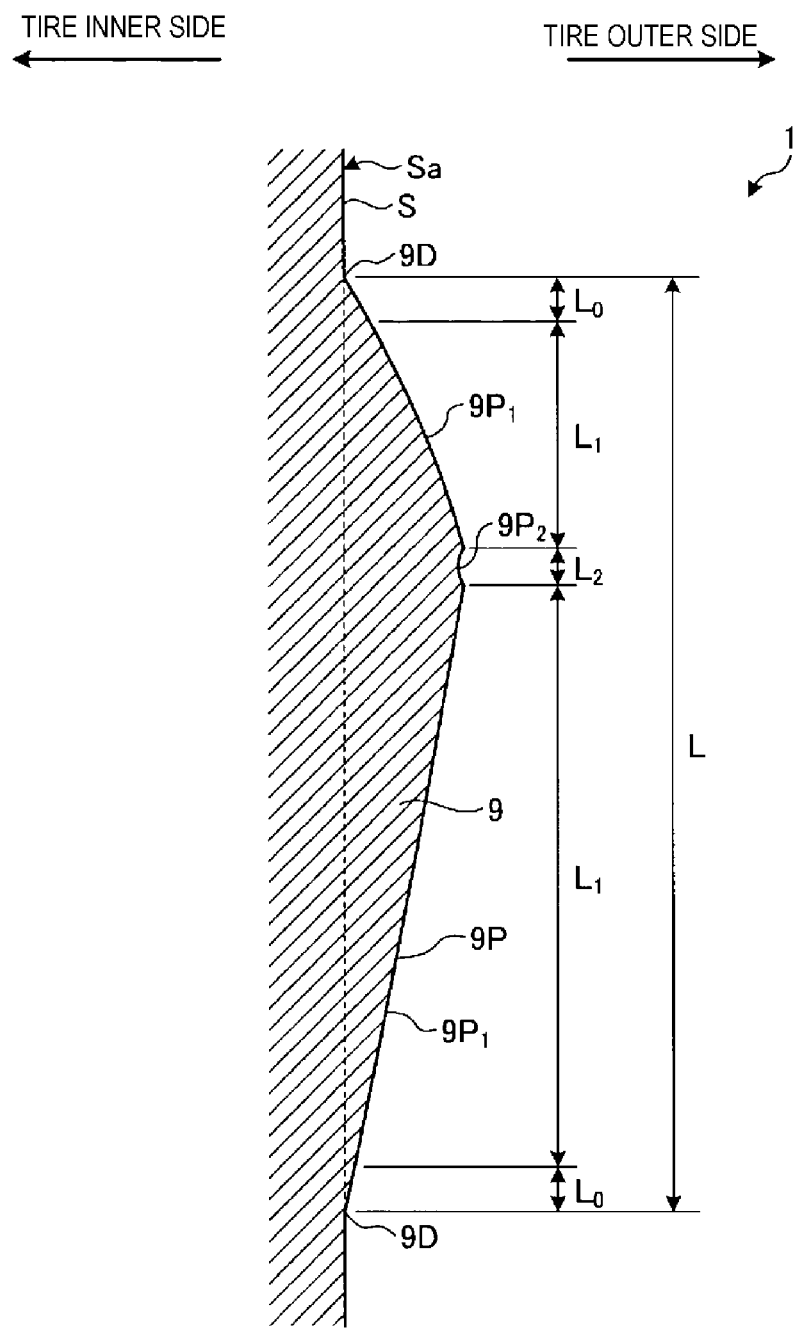
FIG. 7 is a cross-sectional view of a protrusion portion of another example in the longitudinal direction.
Figure 8:
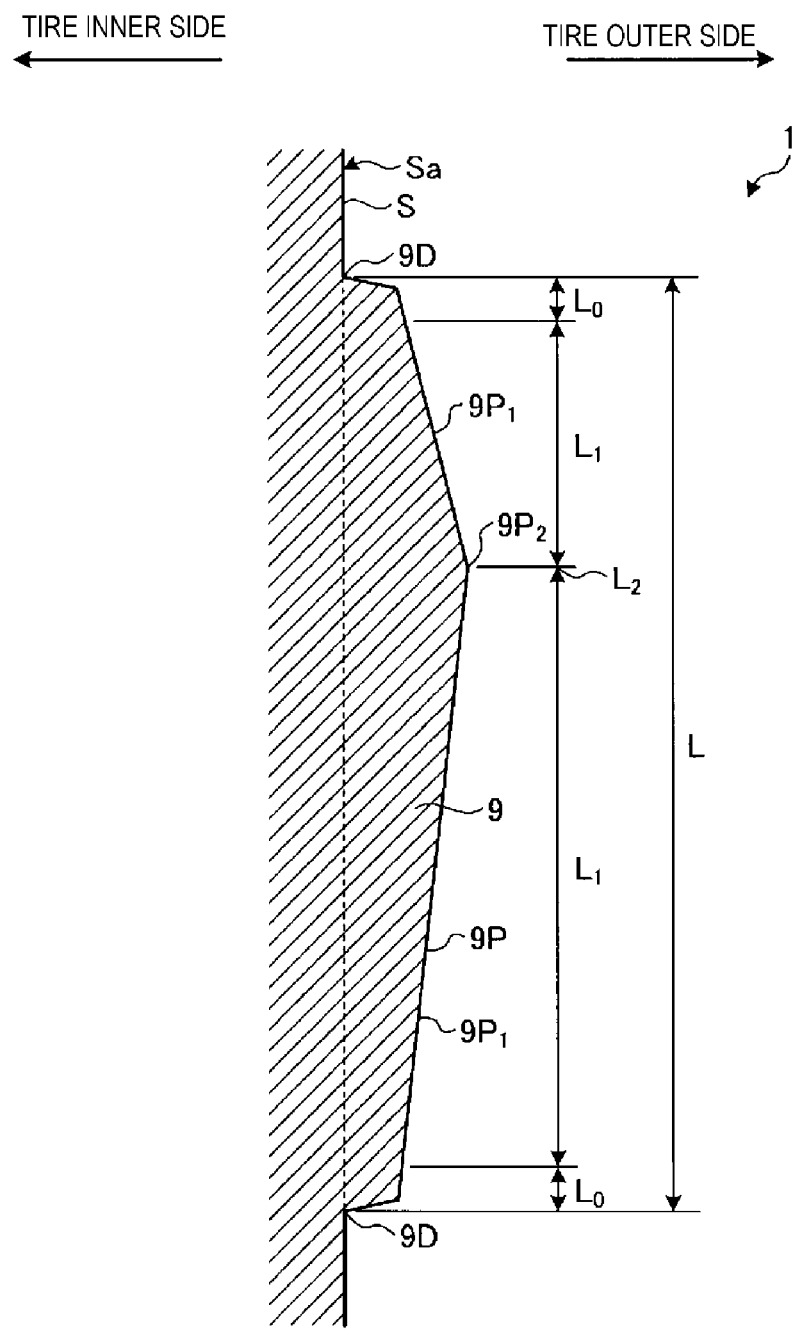
FIG. 8 is a cross-sectional view of a protrusion portion of another example in the longitudinal direction.
Figure 9:
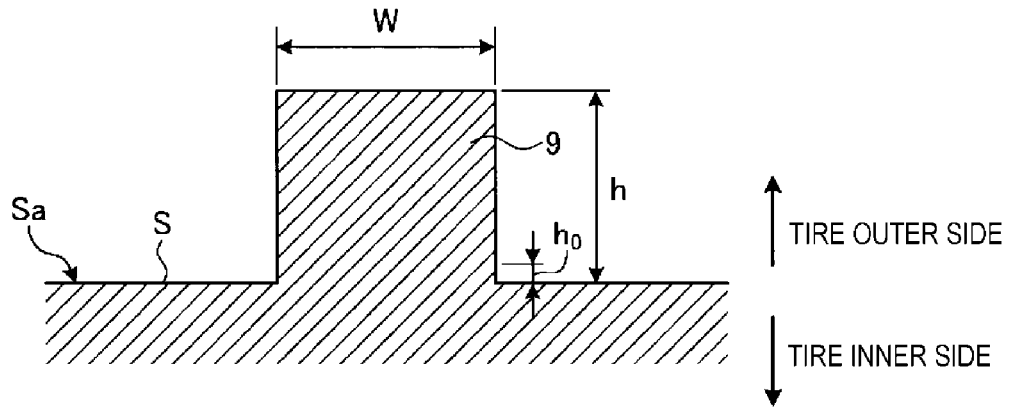
FIG. 9 is a cross-sectional view of a protrusion portion in the lateral direction.
Figure 10:
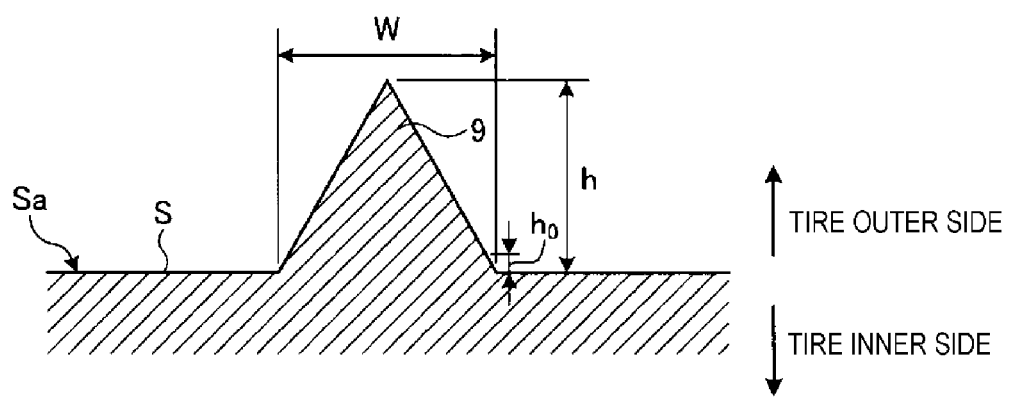
FIG. 10 is a cross-sectional view of a protrusion portion of another example in the lateral direction.
Figure 11:
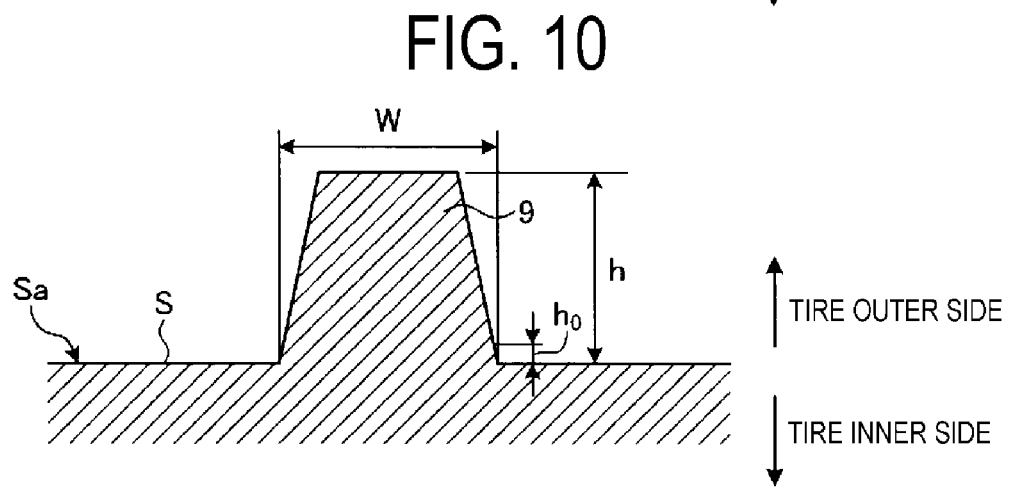
FIG. 11 is a cross-sectional view of a protrusion portion of another example in the lateral direction.
Figure 12:
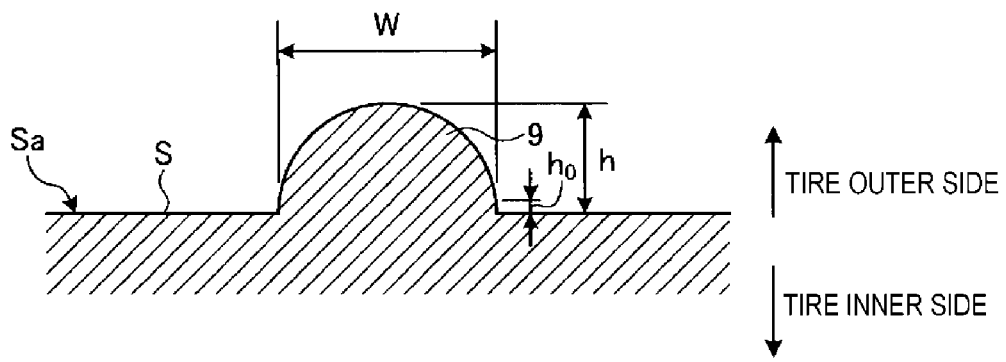
FIG. 12 is a cross-sectional view of a protrusion portion of another example in the lateral direction.

The connection portion $9P_2$ connects the main external contour portions $9P_1$, and is connected to each of the main external contour portions $9P_1$ via an inflection point. The connection portion $9P_2$ may be formed as a point so that inflection points connected to the main external contour portions $9P_1$ coincide at a point as illustrated in FIGS. 3, 4, and 8, or may have a predetermined interval in the longitudinal direction between the inflection points connected to the main external contour portions $9P_1$ as illustrated in FIGS. 5 to 7 When the connection portion $9P_2$ has a predetermined interval in the longitudinal direction, the connection portion $9P_2$ may be formed in a convex shape so as to be separated toward the outer side of the tire from the tire side surface Sa as illustrated in FIG. 5, the connection portion $9P_2$ may be formed in a linear shape as illustrated in FIG. 6, or may be formed in a concave shape so as to approach the inner side of the tire with respect to the tire side surface Sa as illustrated in FIG. 7. When the connection portion $9P_2$ is assumed to be a corner present between the main external contour portions $9P_1$, the connection portion $9P_2$ is formed as a projected corner at which two main external contour portions $9P_1$ come into contact with each other, the corner protruding outside the tire with respect to the tire side surface Sa. In other words, there is not included a configuration in which the connection portion $9P_2$ is formed as a recessed corner which is dented toward the inner side of the tire with respect to the tire side surface Sa, when the connection portion $9P_2$ is a corner.

Figure 13:
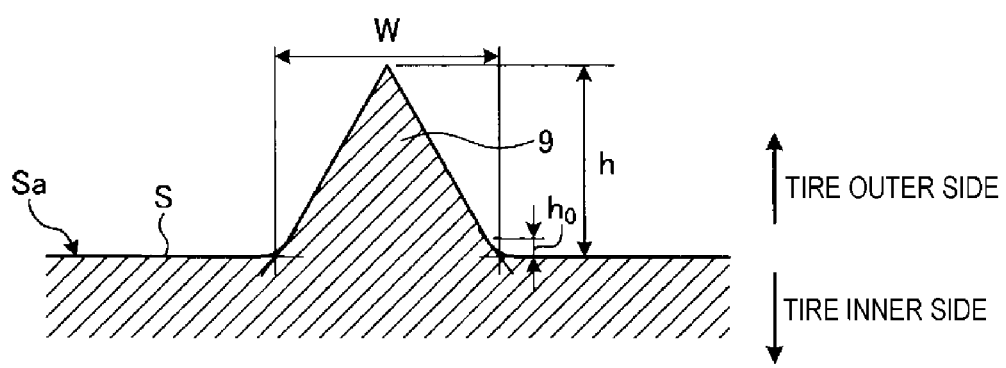
FIG. 13 is a cross-sectional view of a protrusion portion of another example in the lateral direction.
Figure 14:
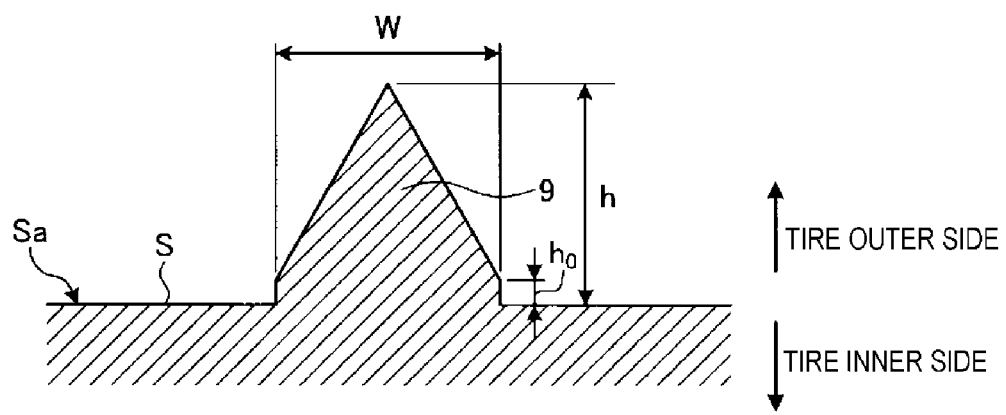
FIG. 14 is a cross-sectional view of a protrusion portion of another example in the lateral direction.

A cross-sectional shape of the protrusion portion 9 in the lateral direction that is orthogonal to the extension direction (straight line L) will be described. The protrusion portion 9 illustrated in FIG. 9 has a rectangular cross-sectional shape in the lateral direction. The protrusion portion 9 illustrated in FIG. 10 has a triangular cross-sectional shape in the lateral direction. The protrusion portion 9 illustrated in FIG. 11 has a trapezoidal cross-sectional shape in the lateral direction. While not limited to FIGS. 9 to 11 and not clearly illustrated in the drawings, the protrusion portion 9 may have a polygonal cross-sectional shape in the lateral direction. In addition, while in FIGS. 9 to 11, the cross-sectional shape of the protrusion portion 9 in the lateral direction is illustrated as a corner portion, the corner portion may be C-chamfered or R-chamfered. The protrusion portion 9 illustrated in FIG. 12 has a semi-circular cross-sectional shape in the lateral direction. While not limited to FIG. 12 and not illustrated in the drawings, the cross-sectional shape of the protrusion portion 9 in the lateral direction may also be a semi-oval shape, a semi-elliptical shape, or any other arcuate shape. In addition, while the protrusion portions 9 illustrated in FIGS. 9 to 12 each are formed to rise directly from the tire side surface Sa, as illustrated in FIG. 13, the rising portion may be smoothly formed with an arc portion, or the rising portion may be formed with a step portion, as illustrated in FIG. 14. Note that the cross-sectional shape of the protrusion portion 9 in the lateral direction does not need to be a symmetric shape at the left and right of the drawings as illustrated in FIGS. 9 to 14, but may be an asymmetrical shape.

Furthermore, in the protrusion portion 9, the external contour 9P having a cross-sectional shape in the longitudinal direction illustrated in each of FIGS. 3 to 8 described above is formed along a ridge line where the corner portion (including the chamfer treatment) is continuous in the longitudinal direction in the cross-sectional shape in the lateral direction described above illustrated in each of FIGS. 9 to 11, 13, and 14. That is, the cross section in the longitudinal direction illustrated in each of FIGS. 3 to 8 is taken along a ridge line where the corner portion is continuous in the longitudinal direction in each of FIGS. 9 to 11, 13, and 14. Additionally, in the protrusion portion 9, the external contour 9P having a cross-sectional shape in the longitudinal direction illustrated in each of FIGS. 3 to 8 described above is formed along a plane where the sides are continuous in the longitudinal direction in the cross-sectional shape in the lateral direction described above illustrated in each of FIGS. 9 to 14. In other words, the cross section in the longitudinal direction illustrated in each of FIGS. 3 to 8 is taken along a plane where the sides are continuous in the longitudinal direction in each of FIGS. 9 to 14.

As described above, the pneumatic tire 1 of the present embodiment includes a plurality of protrusion portions 9 that extend along the tire side surface Sa of the tire side portion S longitudinally intersecting the tire circumferential direction or the tire radial direction and are provided at intervals in the tire circumferential direction, and each of the protrusion portions 9 is formed to include a plurality of main external contour portions $9P_1$ having different curvatures and a connection portion $9P_2$ that connects the main external contour portions $9P_1$, the external contour 9P projecting from the tire side surface Sa in a cross-sectional shape along the longitudinal direction.

Figure 15:
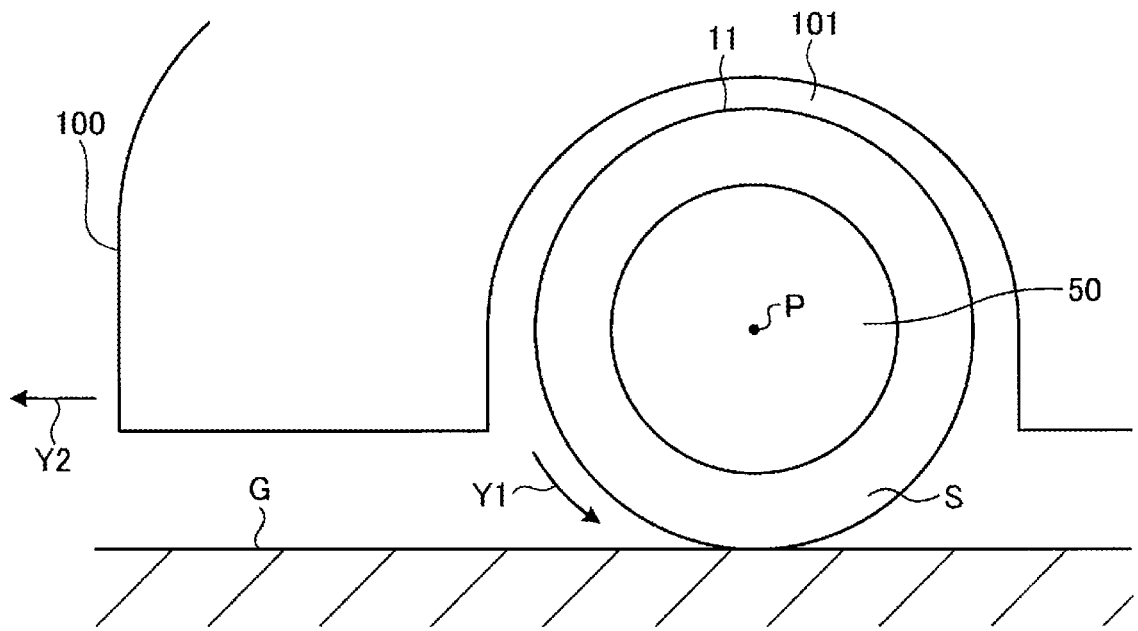
FIG. 15 is an explanatory diagram of the function of a related-art pneumatic tire.
Figure 16:
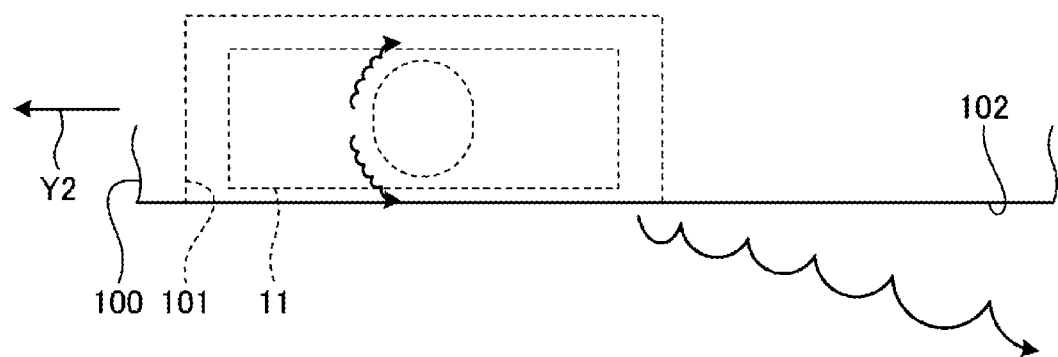
FIG. 16 is an explanatory diagram of the function of a related-art pneumatic tire.
Figure 17:
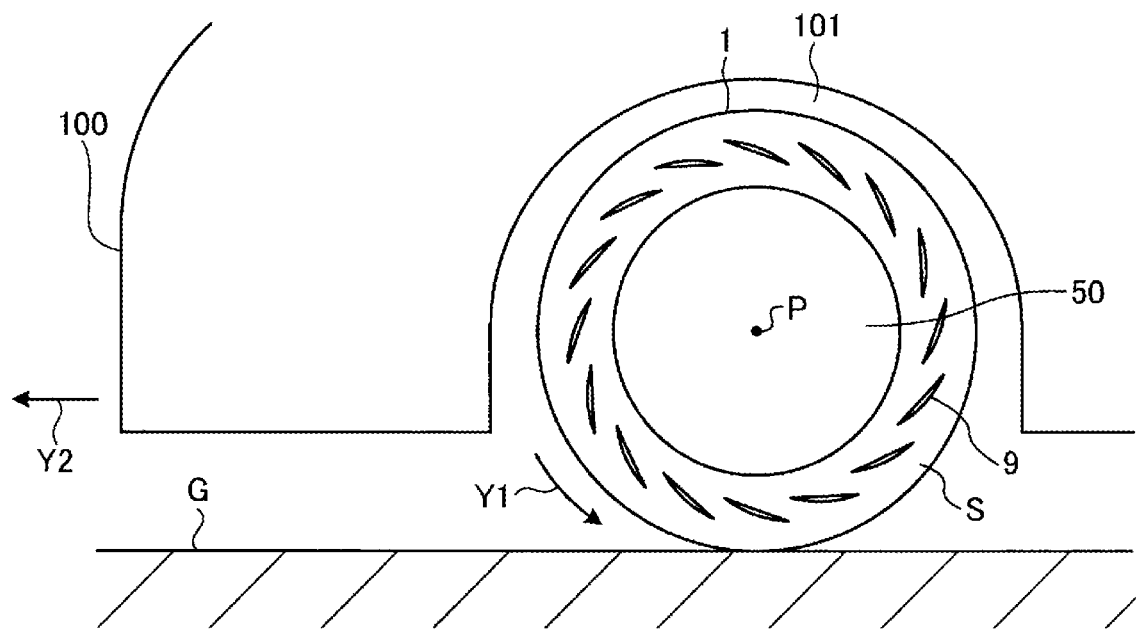
FIG. 17 is an explanatory diagram of the function of a pneumatic tire according to an embodiment of the present technology.
Figure 18:
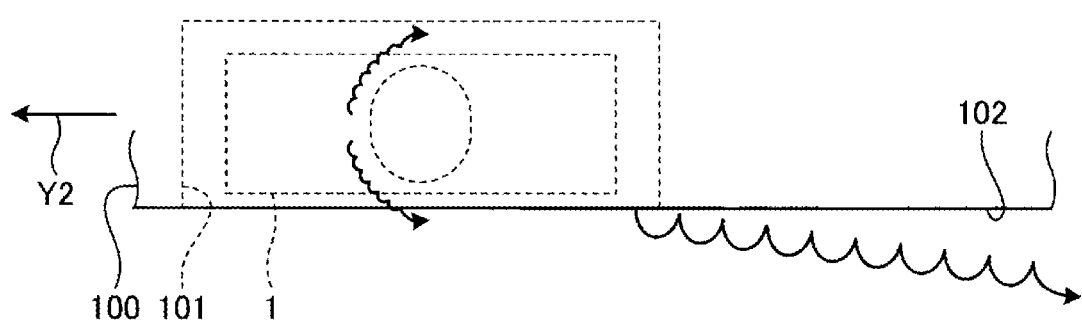
FIG. 18 is an explanatory diagram of the function of a pneumatic tire according to an embodiment of the present technology.
Figure 19:
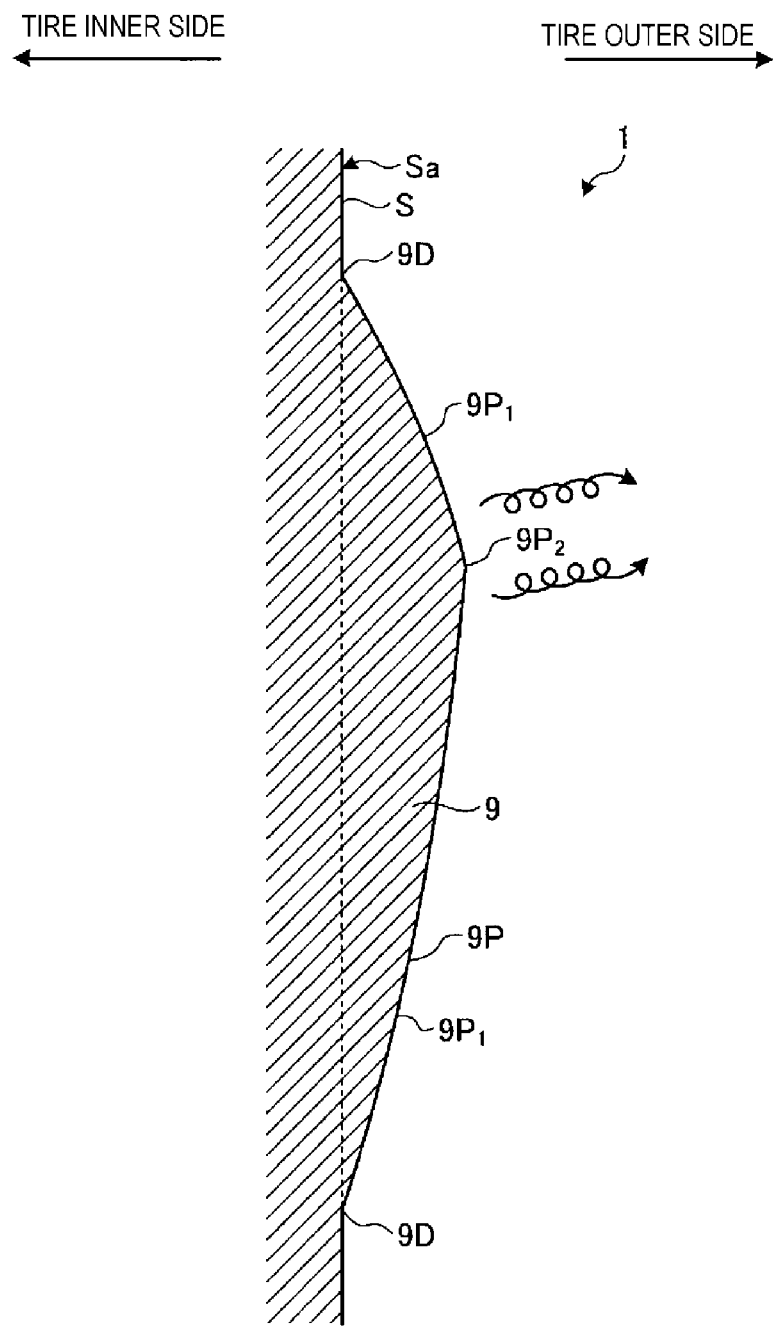
FIG. 19 is an explanatory diagram of the function of a pneumatic tire according to an embodiment of the present technology.

A function of the pneumatic tire 1 will be described. FIGS. 15 and 16 are explanatory diagrams of a function of a related-art pneumatic tire. FIGS. 17 to 19 are explanatory diagrams of the function of a pneumatic tire according to the present embodiment.

As illustrated in FIG. 15, a related-art pneumatic tire 11 including no protrusion portion 9 is incorporated in a rim 50 to be mounted on a vehicle 100 and thus is disposed in a tire housing 101 of the vehicle 100. In this state, when the pneumatic tire 11 rotates in the rotation direction Y1, the vehicle 100 travels in the direction Y2. When the vehicle 100 is traveling, flow of air around the pneumatic tire 11 stagnates. Then, as illustrated in FIG. 16, a bulge of air separating from a side surface 102 of the vehicle 100 is formed outside of the tire housing 101 to avoid the stagnation, causing air resistance.

With respect to this phenomenon, as illustrated in FIG. 17, the pneumatic tire 1 of the present embodiment is incorporated in the rim 50 to be mounted on the vehicle 100 and thus is disposed in the tire housing 101 of the vehicle 100. In this state, when the pneumatic tire 1 rotates in the rotation direction Y1, the vehicle 100 travels in the direction Y2. When the vehicle 100 is traveling, the protrusion portions 9 that rotate in the rotation direction Y1 make the air around the pneumatic tire 1 turbulent and minimize the stagnated flow of air described above. Specifically, at the upper portion of the pneumatic tire 1 when the pneumatic tire 1 is rotating (upper side of the rotation axis P), a turbulent flow boundary layer is generated. This promotes the flow of air around the pneumatic tire 1. As a result, as illustrated in FIG. 18, the bulge of air separating away from the side surface 102 of the vehicle 100 on the outer side of the tire housing 101 can be suppressed to reduce the air resistance generated in the vehicle 100. Reducing the air resistance leads to an improvement in the fuel economy of the vehicle 100.

In particular, in the pneumatic tire 1 of the present embodiment, the external contour 9P of the protrusion portion 9 includes a plurality of main external contour portions $9P_1$ having different curvatures, and a connection portion $9P_2$ that connects the main external contour portions $9P_1$, so that the flows of air along the main external contour portions $9P_1$ having different curvatures collide at the position of the connection portion $9P_2$ to generate a vortex using the connection portion $9P_2$ as a starting point, thereby assisting in generating the turbulent flow boundary layer. As a result, the flow of air in the pneumatic tire 1 is further promoted, and the bulge of air separating away from the side surface 102 of the vehicle 100 on the outer side of the tire housing 101 is further suppressed, so that the effect of reducing the air resistance generated in the vehicle 100 can be improved.

The above-described vortex using the connection portion $9P_2$ as a starting point occurs because the external contour 9P of the protrusion portion 9 is formed along the ridge line (the corner portion in the cross-sectional shape in the lateral direction of each of FIGS. 9 to 11, 13, and 14) of the protrusion portion 9. Accordingly, the external contour 9P is preferably formed in the longitudinal direction along the ridge line of the protrusion portion 9.

Additionally, the above-described vortex using the connection portion $9P_2$ as a starting point occurs because the external contour 9P of the protrusion portion 9 is formed along the surface of the protrusion portion 9 (the side in the cross-sectional shape in the lateral direction of each of FIGS. 9 to 14). Accordingly, the external contour 9P is preferably formed in the longitudinal direction along the surface of the protrusion portion 9.

Additionally, in the pneumatic tire 1 of the present embodiment, as illustrated in FIGS. 3 to 8, the external contour 9P preferably includes the main external contour portions $9P_1$ and the connection portion $9P_2$ that are formed in a range excluding the range $L_0$ from each of the ends 9D in the longitudinal direction to (L×0.05) with respect to the dimension L of the protrusion portion 9 in the longitudinal direction.

In the range $L_0$ from each of the ends 9D of the protrusion portion 9 in the longitudinal direction to (L×0.05), the range of the main external contour portions $9P_1$ is small and even if the flows of air along the main external contour portions $9P_1$ collide at the position of the connection portion $9P_2$, a vortex using the connection portion $9P_2$ as a starting point is hardly generated. Accordingly, by forming the main external contour portions $9P_1$ and the connection portion $9P_2$ in the range excluding the range $L_0$ from each of the ends 9D of the protrusion portion 9 in the longitudinal direction to (L×0.05), a vortex using the connection portion $9P_2$ as a starting point is appropriately generated, so that a reduction effect of the air resistance generated in the vehicle 100 can be remarkably achieved. Since in the range $L_0$ which is near the tire side surface Sa, the air flow attached to the tire side surface Sa due to the influence of the viscosity of air is formed, and a vortex using the connection portion $9P_2$ as a starting point is unlikely to be generated, the range $L_0$ is excluded to appropriately generate a vortex using the connection portion $9P_2$ as a starting point, so that the effect of reducing the air resistance can be obtained. Accordingly, as illustrated in FIG. 8, even in a case where a step portion having a configuration similar to that of the connection portion $9P_2$ is provided in the range $L_0$ from each of the ends 9D of the protrusion portion 9 in the longitudinal direction, the step portion is less likely to generate a vortex and thus does not form the connection portion $9P_2$ in the present embodiment.

In addition, in the pneumatic tire 1 of the present embodiment, the external contour 9P preferably has the main external contour portions $9P_1$ each formed in a range $L_1$ that is not less than (L×0.7) and not greater than (L×0.9), and the connection portion $9P_2$ formed in the range $L_2$ that is not less than (L×0) and not greater than (L×0.3) with respect to the dimension L of the protrusion portion 9 in the longitudinal direction. In this case, the range $L_1$ of the main external contour portions $9P_1$ is a total of the ranges $L_1$ of all the main external contour portions $9P_1$, and when there are also a plurality of the ranges $L_2$ of the connection portion $9P_2$, the range $L_2$ of the connection portion $9P_2$ is a total of all the ranges $L_2$ of the connection portion $9P_2$.

When the main external contour portions $9P_1$ each are formed in the range $L_1$ that is not less than (L×0.7) with respect to the dimension L of the protrusion portion P in the longitudinal direction, the flows of air along the main external contour portions $9P_1$ can be caused to collide with each other at the position of the connection portion $9P_2$ to sufficiently generate a vortex using the connection portion $9P_2$ as a starting point. On the other hand, when one of the main external contour portions $9P_1$ is formed in the range $L_1$ that is not greater than (L×0.9) with respect to the dimension L of the protrusion portion 9 in the longitudinal direction, the range $L_1$ of the other one of the main external contour portions $9P_1$ that is across the connection portion $9P_2$ is ensured, and as a result, the flows of air along both the main external contour portions $9P_1$ with the connection portions $9P_2$ interposed therebetween can be caused to collide with each other at the position of the connection portion $9P_2$ to sufficiently generate a vortex using the connection portions $9P_2$ as a starting point. In the range $L_1$, the connection portion $9P_2$ is set at a position away from the tire side surface Sa to the outer side of the tire, and by setting the range $L_1$ to a position away from the air flow attached near the tire side surface Sa due to the viscosity of air, a vortex using the connection portion $9P_2$ as a starting point can be appropriately generated to obtain the effect of reducing the air resistance.

In addition, in the pneumatic tire 1 of the present embodiment, in FIG. 2, when the pneumatic tire 1 is incorporated into the regular rim, inflated to the regular internal pressure, ground to a road surface G that is a horizontal surface with the regular load (indicated in a state of load 0 (unloaded) in FIG. 2), and is rolling toward the left in FIG. 2 by rotating in the rotation direction Y on the road surface G, in a case where a relative speed U between the tire side portion S and the road surface G is expressed by U [m/s]=V×r/Q, and a Reynolds number Re is represented by Re=U×Q/v wherein V is a primary flow velocity (corresponding to the vehicle traveling speed) [m/s], Q is the distance from the road surface G to the rotation axis P [m], r is the distance from the road surface G toward the rotation axis P [m], and v is the kinematic viscosity of air in contact with the pneumatic tire 1 [m$^2$/s], and the primary flow velocity V [m/s] is 27.8, the protrusion portion 9 is provided at a position where a range of the Reynolds number Re satisfies 2000<Re<4×10$^5$.

In other words, in the pneumatic tire 1 of the present embodiment, in the primary flow velocity V [m/s], the protrusion portion 9 is provided at a position of a distance r [m] where the range of the Reynolds number Re satisfies 2000<Re<4×10$^5$.

A function of the pneumatic tire 1 having this configuration will be described. As illustrated in FIG. 15, the related-art pneumatic tire 11 having no protrusion portion 9 rotates in the rotation direction Y1, and when the vehicle 100 travels in the direction Y2, the flow of air varies around the periphery of the pneumatic tire 11. As a result, due to the flow of air, as illustrated in FIG. 16, the amount of air that flows from the front end to the tire side portion S at the ground contact portion of the pneumatic tire 11 is smaller, the pressure in the space between the road surface G and the vehicle bottom surface increases, and a lift, which is a force to lift the vehicle 100 upward, is generated.

With respect to such a phenomenon, as illustrated in FIG. 17, when the pneumatic tire 1 of the present embodiment rotates in the rotation direction Y1 and the vehicle 100 travels in the direction Y2, a guiding effect (reject effect) of air around the protrusion portion 9 is increased by the protrusion portion 9 that rotates and moves in the rotation direction Y1 to reduce the pressure in the space between the road surface and the vehicle bottom surface. Specifically, in the ground contact portion that is the lower portion of the pneumatic tire 1 when the pneumatic tire 1 is rotated (the position of the distance r [m] where the range of the Reynolds number Re satisfies 2000<Re<4×10$^5$), the guiding effect of air (reject effect) by the protrusion portion 9 is large, and as illustrated in FIG. 18, in the ground contact portion of the pneumatic tire 1, the amount of air that flows from the front end to the tire side portion S increases, the pressure in the space between the road surface and the vehicle bottom surface decreases, and the lift, which is a force to lift the vehicle 100 upward, is reduced.

Reducing the lift (lift-reducing performance) results in an increase in downforce, an improvement in contact of the pneumatic tire 1 with the ground, and an improvement in steering stability performance, which is a measure of driving performance of the vehicle 100.

Additionally, in the pneumatic tire 1 of the present embodiment, in the range of Reynolds number Re described above, the range of the total volume Vo of the protrusion portions 9 preferably satisfies 1000 [mm$^3$]≤Vo≤50000 [mm$^3$]. That is, by defining the total volume Vo of the protrusion portions 9 in the range of Reynolds number Re described above, the guiding effect (reject effect) by the protrusion portions 9 is increased, and the amount of air that flows from the front end to the tire side portion S increases at the ground contact portion of the pneumatic tire 1, so that the pressure in the space between the road surface and the vehicle bottom surface can be further reduced to further reduce the lift.

In addition, preferably, the rotation direction of the pneumatic tire 1 of the present embodiment when mounted on a vehicle is designated, and in the aforementioned range of Reynolds number Re, as illustrated in FIG. 2, at least one of the protrusion portions 9 is formed so that the extension direction from its starting edge to its terminating edge along the rotation direction Y is inclined from the inner side in the tire radial direction toward the outer side in the tire radial direction. Although not illustrated in the drawings, for example, the designation of the rotation direction is indicated by an indicator (for example, an arrow that points in the rotation direction when the vehicle travels forward) provided on the sidewall portion 4 on the side surface of the tire located on the outer side of the tread portion 2 in the tire width direction. That is, with this configuration, since air is guided from an upper side to a lower side of the front end at the ground contact portion of the pneumatic tire 1, the guiding effect (reject effect) due to the protrusion portions 9 is increased and the amount of air that flows from the front end to the tire side portion S increases at the ground contact portion of the pneumatic tire 1, so that the pressure in the space between the road surface and the vehicle bottom surface can be further reduced to further reduce the lift.

Figure 20:
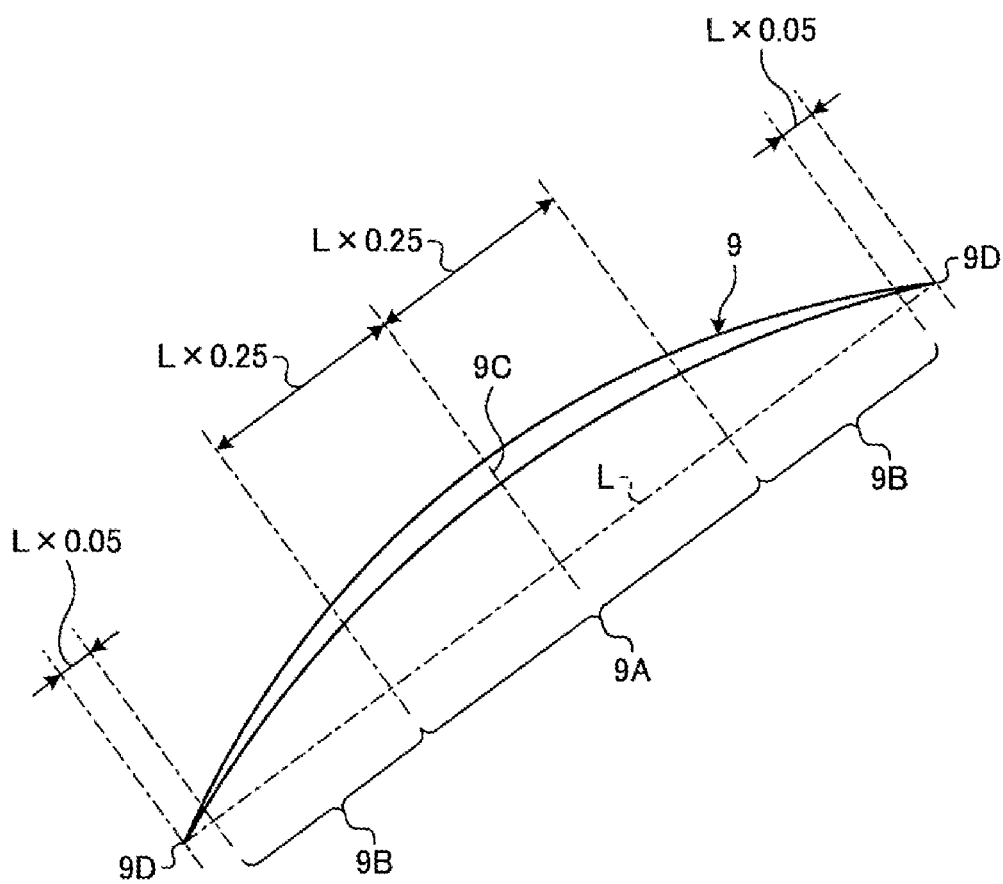
FIG. 20 is an enlarged view of a protrusion portion as viewed from the side of the pneumatic tire.
Figure 21:
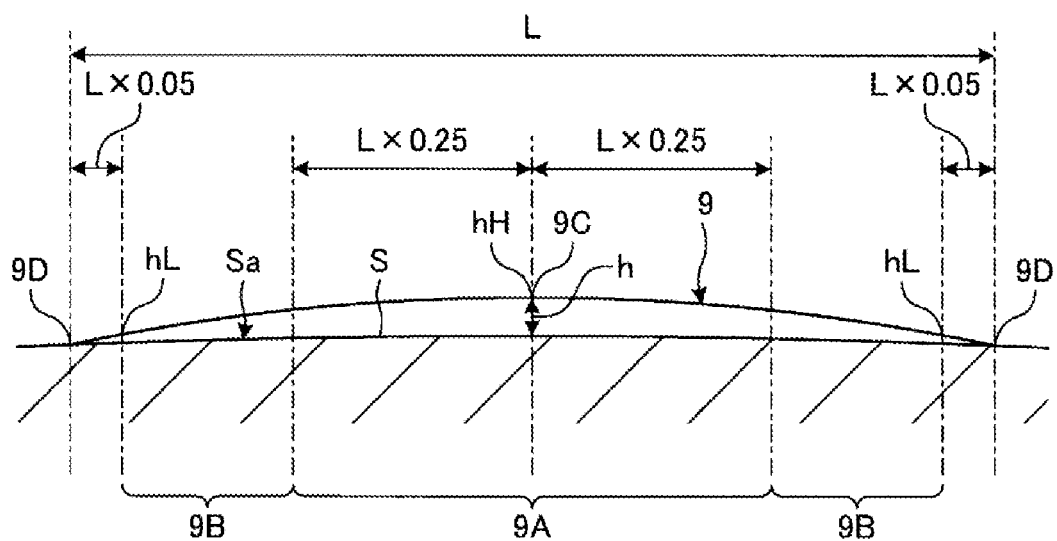
FIG. 21 is a side view of a protrusion portion.

As illustrated in the enlarged view of the protrusion portion when viewed from the side of the pneumatic tire in FIG. 20 and the side view of the protrusion portion in FIG. 21, the protrusion portion 9 each include an intermediate portion 9A in the extension direction, and tip portions 9B provided continuing from the intermediate portion 9A on either side in the extension direction. The intermediate portion 9A is a portion in the range of 25% (L×0.25) of the length L of the protrusion portion 9 in the extension direction from a center 9C on either side in the extension direction. The tip portions 9B are portions that extend from the intermediate portion 9A on both sides in the extension direction excluding 5% (L×0.05) of the length L of the protrusion portion 9 in the extension direction from each of the ends 9D in the extension direction. The length L of the protrusion portion 9 in the extension direction is the shortest distance between the ends 9D of the protrusion portion 9.

The intermediate portion 9A also includes a highest position hH where the projection height h from the tire side surface Sa is the greatest. The tip portion 9B also includes a lowest position hL where the projection height h from the tire side surface Sa is the lowest. In FIG. 21, the projection height h of the protrusion portion 9 in the extension direction gradually increases from one end 9D toward the center 9C and gradually decreases from the center 9C toward the other end 9D. In such a configuration, the highest position hH of the projection height h corresponds with the center 9C, and the lowest position hL corresponds with the ends of the tip portions 9B, i.e. the positions 5% of the length L from the ends 9D. Note that although in FIG. 21, the projection height h of the protrusion portion 9 in the extension direction is illustrated as changing into an arc shape for convenience, in the cross-sectional shape along the longitudinal direction, the external contour 9P includes the plurality of main external contour portions $9P_1$ and the connection portion $9P_2$, and is formed into a ridge line and a surface, as described above. Additionally, the highest position hH may include the entire intermediate portion 9A, and in such a configuration, the tip portions 9B may have a projection height h that gradually decreases from the intermediate portion 9A.

In this way, according to the pneumatic tire 1 of the present embodiment, in the protrusion portion 9, the intermediate portion 9A in the extension direction includes the highest position hH of the projection height h from the tire side surface Sa, and the tip portions 9B provided on either side of the intermediate portion 9A in the extension direction each include the lowest position hL of the projection height h from the tire side surface Sa. According to this pneumatic tire 1, the mass of the protrusion portion 9 is reduced at the tip portion 9B. As a result, since a sudden change in mass from the tire side surface Sa at areas near the tip portions 9B of the protrusion portion 9 is prevented, durability of the protrusion portion 9 can be improved and uniformity in the tire circumferential direction can be improved, thereby improving uniformity.

The arrangement of the protrusion portions 9 is illustrated in a side view of the pneumatic tire illustrated in each of FIGS. 2 and 22 to 29. In the pneumatic tire 1 illustrated in each of FIGS. 2, 22, and 23, the protrusion portions 9 are disposed at positions of the tire maximum width H (see FIGS. 24 to 29). "Positions of tire maximum width H" are positions largest in the tire width direction, excluding any patterns and alphanumerics on a tire side surface from the total width of the tire that is largest in the tire width direction, when the pneumatic tire is incorporated in the regular rim, inflated to the regular internal pressure, and in an unloaded state. In tires provided with a rim protection bar (provided in the tire circumferential direction and projecting outward in the tire width direction) that protects the rim, the rim protection bar is the outermost portion in the tire width direction, but the tire maximum width H as defined in the present embodiment excludes the rim protection bar. In the pneumatic tire 1 illustrated in each of FIGS. 24 to 29, the protrusion portions 9 are not disposed at the position of the tire maximum width H. In the pneumatic tire 1 illustrated in each of FIGS. 24 and 25, the protrusion portions 9 are disposed outward in the tire radial direction with respect to the positions of tire maximum width H. In the pneumatic tire 1 illustrated in each of FIGS. 26 and 27, the protrusion portions 9 are disposed inward in the tire radial direction with respect to the positions of tire maximum width H. In the pneumatic tire 1 illustrated in each of FIGS. 28 and 29, the protrusion portions 9 are disposed outward with respect to the positions of tire maximum width H in the tire radial direction and inward with respect to the positions of tire maximum width H in the tire radial direction, respectively.

Figure 22:
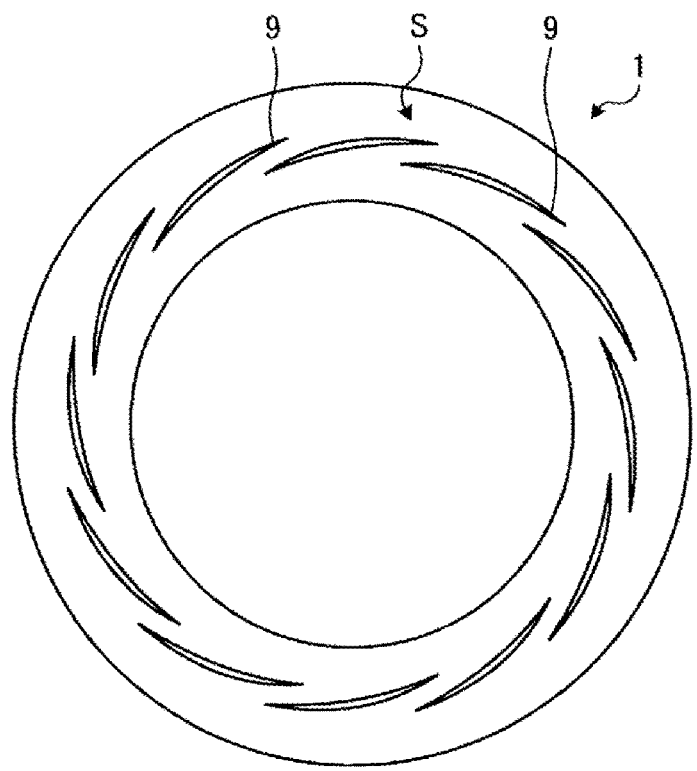
FIG. 22 is a side view of a pneumatic tire according to another embodiment of the present technology.
Figure 23:
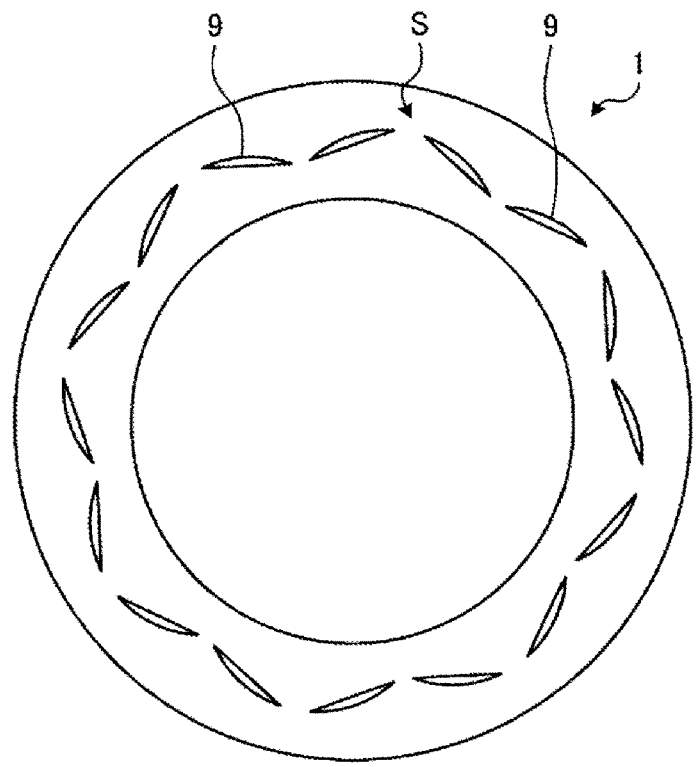
FIG. 23 is a side view of a pneumatic tire according to another embodiment of the present technology.
Figure 24:
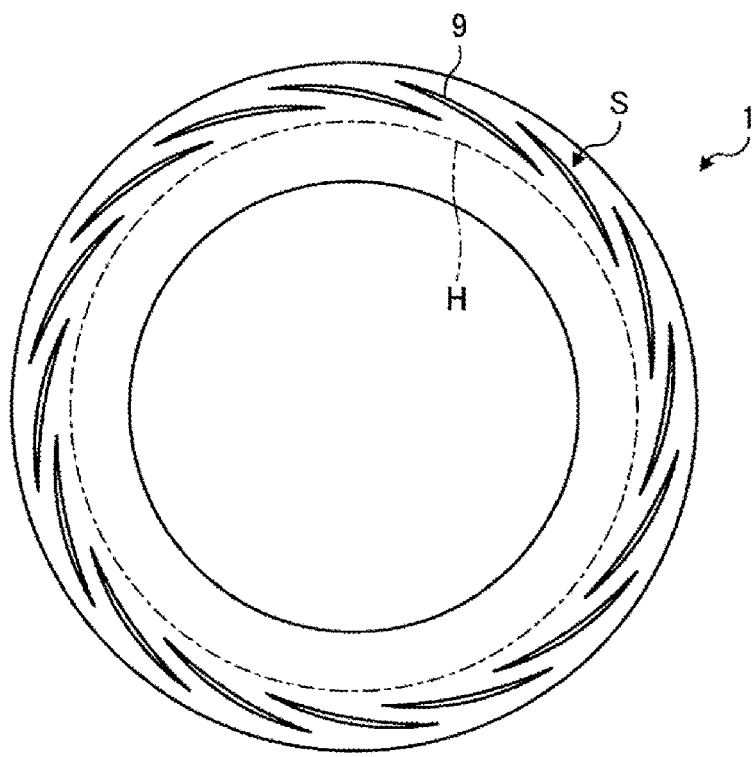
FIG. 24 is a side view of a pneumatic tire according to another embodiment of the present technology.
Figure 25:
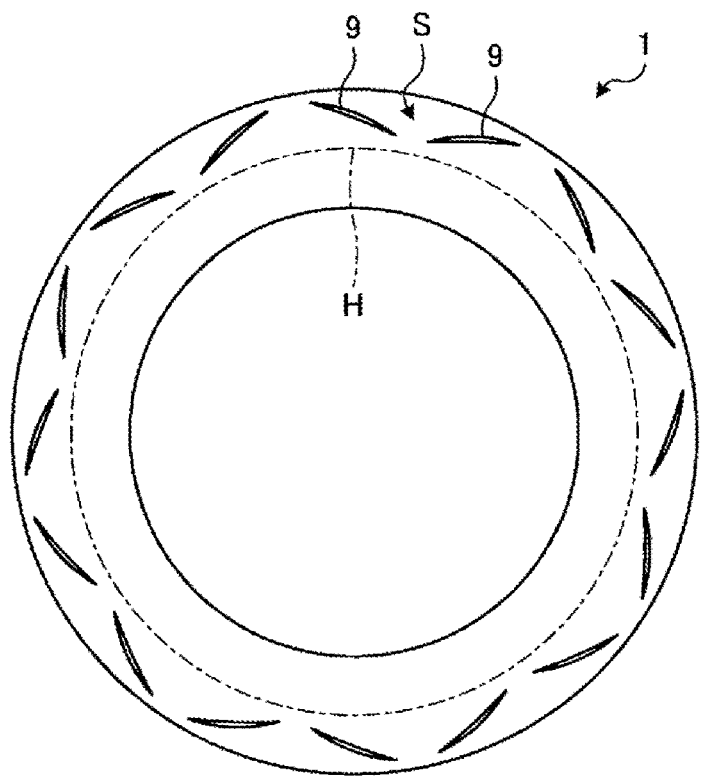
FIG. 25 is a side view of a pneumatic tire according to another embodiment of the present technology.
Figure 26:
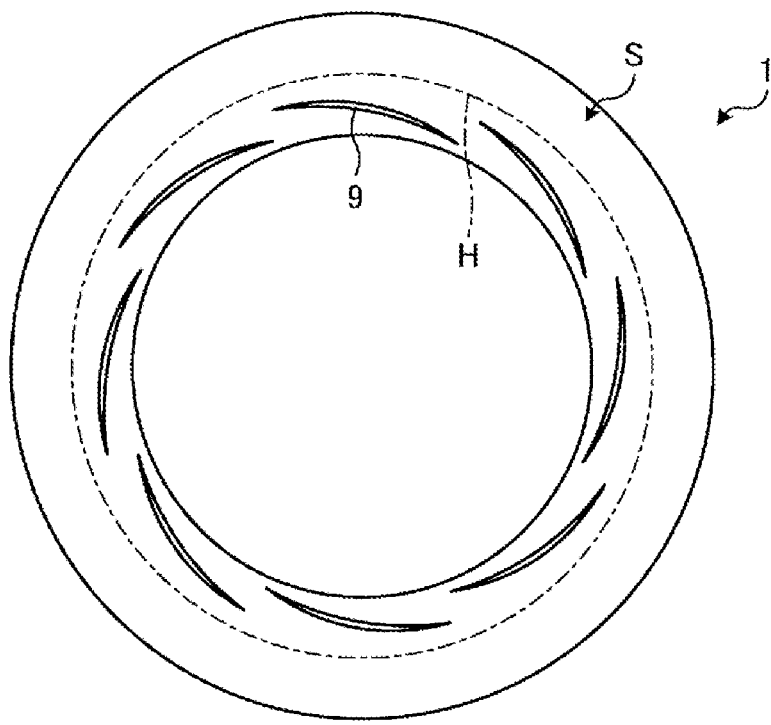
FIG. 26 is a side view of a pneumatic tire according to another embodiment of the present technology.
Figure 27:
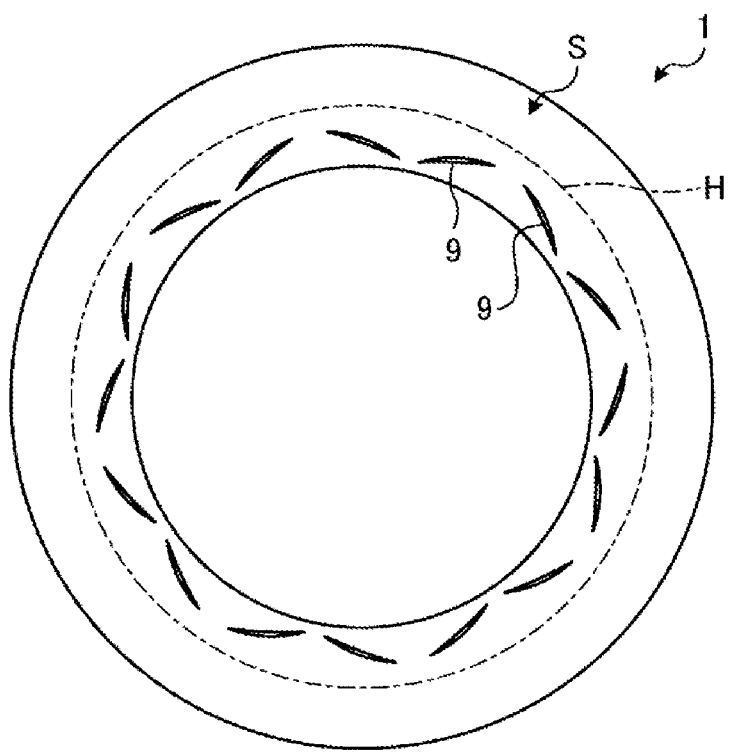
FIG. 27 is a side view of a pneumatic tire according to another embodiment of the present technology.
Figure 28:
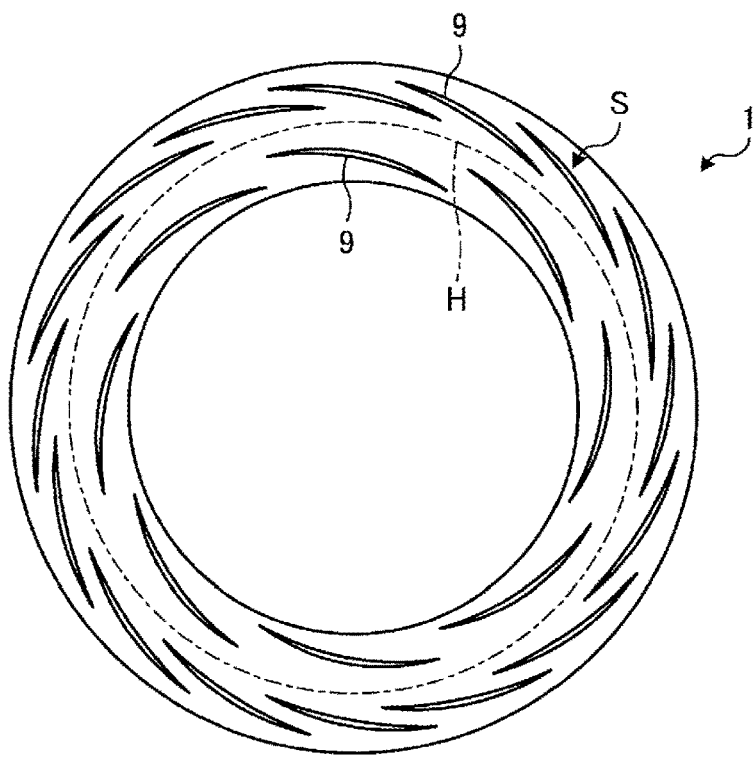
FIG. 28 is a side view of a pneumatic tire according to another embodiment of the present technology.
Figure 29:
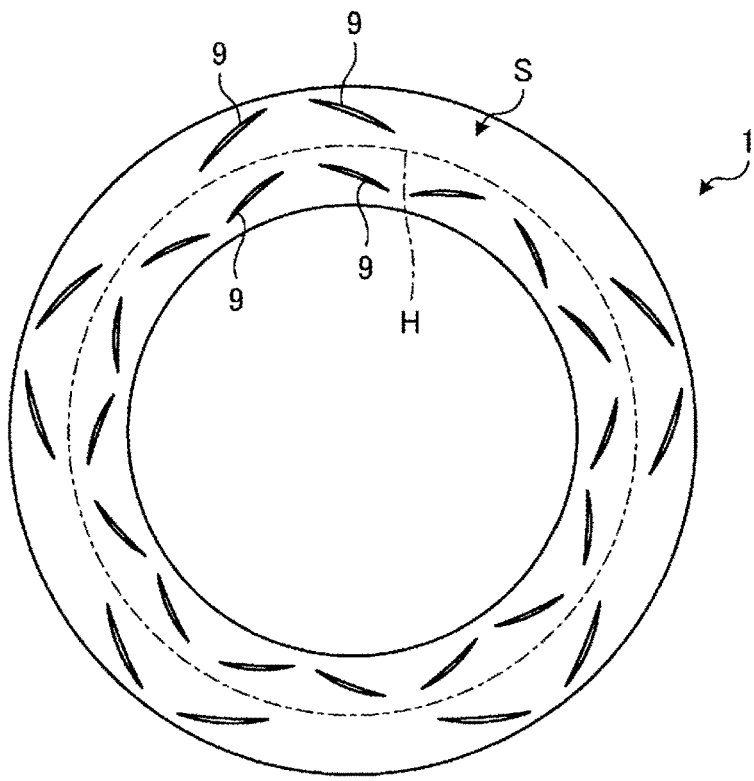
FIG. 29 is a side view of a pneumatic tire according to another embodiment of the present technology.

In FIG. 2, FIG. 23, FIGS. 25 to 27, the inner side in the tire radial direction in FIG. 28, and FIG. 29, the protrusion portions 9 are provided at intervals in the tire circumferential direction. In FIG. 22, FIG. 24, and the outer side in the tire radial direction in FIG. 28, the protrusion portions 9 that are adjacent in the tire circumferential direction are provided so as to partially overlap in the tire radial direction. In cases where the protrusion portions 9 are provided so as to partially overlap in the tire radial direction, the overlap portion is a portion excluding the intermediate portion 9A, and is the tip portion 9B or an end of the tip portion 9B (in a range of 5% of the length L from the end 9D). In FIGS. 2, 22, 24, 26, and 28, inclinations in the extension directions of the protrusion portions 9 adjacent to each other in the tire circumferential direction with respect to the tire circumferential direction and the tire radial direction are the same. In the pneumatic tire 1 illustrated in FIGS. 23, 25, 27, and 29, the inclinations in the extension directions of the protrusion portions 9 adjacent to each other in the tire circumferential direction with respect to the tire circumferential direction and the tire radial direction are different. Note that the arrangement of the protrusion portions 9 is not limited to those illustrated in FIGS. 2 and 22 to 29.

Note that in the cross-sectional shape in the lateral direction of the protrusion portion 9 such as those illustrated in FIGS. 9 to 14, in the present embodiment, the cross-sectional area is greatest at the highest position hH of the projection height h of the intermediate portion 9A, and the cross-sectional area is small at the lowest position hL of the projection height h of the tip portion 9B. A width W in the lateral direction may follow the change in the projection height h and be greatest at the highest position hH and smallest at the lowest position hL, or may not change in this manner.

Additionally, in the pneumatic tire 1 of the present embodiment, the intermediate portion 9A of the protrusion portion 9 preferably has a projection height h (highest position of projection height h) ranging from 2 mm to 10 mm.

If the projection height h of the intermediate portion 9A is less than 2 mm, it is difficult to obtain the effect of guiding air around. When the projection height h of the intermediate portion 9A is greater than 10 mm, the amount of air flow colliding with the protrusion portion 9 is increased. As a result, air resistance is likely to increase. Thus, the projection height h of the intermediate portion 9A preferably ranges from 2 mm to 10 mm.

Additionally, in the pneumatic tire 1 of the present embodiment, as illustrated in FIGS. 9 to 14, the external contour 9P preferably has the main external contour portions $9P_1$ and the connection portion $9P_2$ formed in a range excluding a range ho from the tire side surface Sa to (h×0.05) with respect to the projection height h.

According to the pneumatic tire 1, the range ho from the tire side surface Sa to (h×0.05) is a portion where the flow of air along the tire side surface Sa touches to the protrusion portion 9 and starts to change, and a vortex is less likely to occur using the connection portion $9P_2$ as a starting point. Accordingly, the main external contour portions $9P_1$ and the connection portion $9P_2$ are formed in a range excluding the range ho from the tire side surface Sa to (h×0.05) to appropriately generate a vortex using the connection portion $9P_2$ as a starting point, so that the effect of reducing the air resistance generated in the vehicle 100 can be significantly obtained. Since in the range ho which is near the tire side surface Sa, the air flow attached to the tire side surface Sa due to the influence of the viscosity of air is formed, and a vortex using the connection portion $9P_2$ as a starting point is unlikely to be generated, the range ho is excluded to appropriately generate a vortex using the connection portion $9P_2$ as a starting point, so that the effect of reducing the air resistance can be obtained. Note that an arc portion of (see FIG. 13) or a step portion (see FIG. 14) which is a rising portion from the tire side surface Sa may affect the function of the external contour 9P, and thus it is preferably provided in the range ho which hardly contributes to the function of the external contour 9P.

Additionally, as illustrated in FIG. 2, in the pneumatic tire 1 of the present embodiment, the variation in projection height h of each of the protrusion portions 9 per 1 degree in the tire circumferential direction sectioned using a plane extending from the rotation axis P in the tire radial direction is preferably 1 mm/deg or less.

According to the pneumatic tire 1, by defining the variation in projection height h of the protrusion portions 9 in the tire circumferential direction, it is possible to suppress wind noise generated by the variation in shape of the protrusion portions 9, so that noise generated from the protrusion portions 9 by the wind noise can be reduced. According to the pneumatic tire 1, by defining the variation in projection height h of the tire in the tire circumferential direction including the protrusion portions 9, uniformity in the tire circumferential direction is improved, so that the effect of improving uniformity can be significantly obtained.

Additionally, as illustrated in FIG. 2, in the pneumatic tire 1 of the present embodiment, the variation in mass of the protrusion portions 9 per 1 degree in the tire circumferential direction sectioned using a plane extending from the rotation axis P in the tire radial direction is preferably 0.1 g/deg or less.

According to the pneumatic tire 1, by defining the variation in mass of the protrusion portions 9 in the tire circumferential direction, mass fluctuation of the protrusion portions 9 can be suppressed, and vibration associated with rotation of the pneumatic tire 1 can be suppressed, so that noise generated from the protrusion portions 9 can be reduced due to this vibration. Furthermore, according to the pneumatic tire 1, by defining the variation in mass of the tire in the tire circumferential direction including the protrusion portion 9, uniformity in the tire circumferential direction is improved, so that the effect of improving uniformity can be significantly obtained.

In the pneumatic tire 1 of the present embodiment, the protrusion portions 9 are preferably disposed at non-uniform intervals in the tire circumferential direction.

According to the pneumatic tire 1, by counteracting the periodicity of the protrusion portions 9 in the tire circumferential direction related to the air flow along the tire side surface Sa of the tire side portion S, the difference in frequency causes the sound pressure generated by the protrusion portions 9 to be dispersed and offset. As a result, noise (sound pressure level) generated from the pneumatic tire 1 can be reduced.

Note that the intervals of the protrusion portions 9, as viewed from the side of the pneumatic tire 1, are taken as angles between auxiliary lines (not illustrated) of the protrusion portions 9, the auxiliary lines being drawn from the rotation axis P to the ends 9D of the protrusion portions 9 in the tire radial direction. Additionally, to make the intervals between the protrusion portions 9 non-uniform, a variety of measures can be performed such as having the shape (projection height h, width W, and length L in the extension direction) of the protrusion portions 9 and the inclination at which the protrusion portions 9 intersect the tire circumferential direction and the tire radial direction the same while changing the pitch in the tire circumferential direction; changing the shape (projection height h, width W, and length L in the extension direction); and changing the inclination at which the protrusion portions 9 intersect the tire circumferential direction and the tire radial direction.

Furthermore, the pneumatic tire 1 of the present embodiment preferably has a designated vehicle inner/outer side orientation when mounted on a vehicle, and the protrusion portions 9 are preferably formed on at least the tire side portion S corresponding to the vehicle outer side.

In other words, when the pneumatic tire 1 of the present embodiment is mounted on the vehicle 100 (see FIG. 17), the orientation with respect to the inner side and the outer side of the vehicle 100 in the tire width direction is designated. The orientation designations, while not illustrated in the drawings, for example, can be shown via indicators provided on the sidewall portions 4. Therefore, the side facing the inner side of the vehicle 100 when mounted on the vehicle 100 is the "vehicle inner side", and the side facing the outer side of the vehicle 100 is the "vehicle outer side". Note that the designations of the vehicle inner side and the vehicle outer side are not limited to cases when mounted on the vehicle 100. For example, in cases in which the pneumatic tire 1 is incorporated in a rim, the orientation of the rim 50 (see FIG. 17) with respect to the inner side and the outer side of the vehicle 100 in the tire width direction is predetermined. Thus, in cases in which the pneumatic tire 1 is mounted on a rim, the orientation with respect to the vehicle inner side and the vehicle outer side in the tire width direction is designated.

The tire side portion S on the outer side of the vehicle is exposed outward from the tire housing 101 when the pneumatic tire 1 is mounted on the vehicle 100. Thus, by providing the protrusion portions 9 on the tire side portion S on the vehicle outer side, the flow of air can be pushed outward the vehicle, so that the effect of breaking a vortex generated from the tire housing 101 down can be significantly obtained in the rear side of the pneumatic tire 1 in the traveling direction.

Note that in the pneumatic tire 1 of the embodiment described above, the protrusion portion 9 illustrated in FIGS. 9 to 14 preferably has the width W in the lateral direction ranging from 0.5 mm to 10.0 mm. When the width W of the protrusion portion 9 in the lateral direction is less than the range described above, the range of the protrusion portion 9 in contact with the flow of air is small. This makes the effect of guiding air around by the protrusion portion 9 difficult to obtain. When the width W of the protrusion portion 9 in the lateral direction is greater than the range described above, the area of the protrusion portion 9 in contact with the air flow is great. This causes the protrusion portions 9 to increase the air resistance and increase the tire weight. Thus, by appropriately setting the width W of the protrusion portion 9 in the lateral direction, the effect of guiding air around by the protrusion portion 9 can be significantly obtained.

Note that the pitch of the protrusion portions 9 in the tire circumferential direction may be the same as or different from the pitch of the lug grooves in the tread portion 2 in the tire circumferential direction. By the pitch of the protrusion portions 9 in the tire circumferential direction being different from the pitch of the lug grooves in the tread portion 2 in the tire circumferential direction, sound pressure generated from the protrusion portions 9 and sound pressure from the lug grooves are dispersed and counteract one another due to the difference in frequency. As a result, pattern noise generated by the lug grooves can be reduced. Note that the lug grooves with a different pitch than the protrusion portions 9 in the tire circumferential direction include all of the lug grooves in the rib-like land portions 23 defined in the tire width direction by the plurality of main grooves 22. However, to significantly obtain the effect of reducing the pattern noise generated by the lug grooves, the pitch of the protrusion portions 9 in the tire circumferential direction is preferably different from the pitch of the lug grooves that are outermost in the tire width direction and disposed nearest the protrusion portions 9.

EXAMPLES

In the present examples, tests for air resistance reducing performance and lift-reducing performance were conducted on a plurality of types of pneumatic tires having different conditions (see FIGS. 30A-30B).

In the tests for lift-reducing performance and air resistance reducing performance, a wind tunnel simulation test was conducted using a vehicle model with tire models having a tire size of 195/65R15 mounted on a body model of a motor assist passenger vehicle. The travel speed was set to the equivalent of 100 km/h. Using fluid analysis software using Lattice Boltzmann methods utilizing an aerodynamic drag coefficient, aerodynamic characteristics (lift-reducing performance and air resistance reducing performance) were calculated. The evaluation results are expressed as index values based on the calculated results with the results of the conventional example being defined as the reference (100). In the index evaluation, larger values indicate superior air resistance reducing performance and lift-reducing performance.

In FIGS. 30A-30B, the pneumatic tires of Conventional Example and Examples 1 to 17 each include the protrusion portions on the tire side surface of the tire side portion. The protrusion portions are provided on the vehicle outer side and the vehicle inner side in the arrangement illustrated in FIG. 2, and each have a side shape as illustrated in FIG. 21 in a lateral cross-sectional view illustrated in FIG. 10. In the pneumatic tire of the Conventional Example, the external contour of each of the protrusion portions does not include the main external contour portion and the connection portion, and the arrangement of the protrusion portions is outside the prescribed Reynolds number Re.

On the other hand, in the pneumatic tires of Examples 1 to 17, the external contour of each of the protrusion portions includes two main external contour portions and one connection portion. Additionally, in the pneumatic tires of Examples 1 to 8, the arrangement of the protrusion portions is outside the prescribed Reynolds number Re. Additionally, in the pneumatic tires of Examples 9 to 17, the arrangement of the protrusion portions is within the prescribed Reynolds number Re. The range y from each end in the longitudinal direction is a range outside the main external contour portions and the connection portion, and indicates the range $L_0$ in the above-described embodiment. The range z of the main external contour portions is a range in which all of the main external contour portions are added up, and all of the ranges $L_1$ in the embodiments described above are added up. The range v of the connection portion is formed from a point and is 0 in the present example.

As can be seen from the test results of FIGS. 30A-30B, the pneumatic tires of Examples have improved air resistance reducing performance.

The invention claimed is:

1. A pneumatic tire comprising a plurality of protrusion portions extending along a tire side surface of a tire side portion longitudinally intersecting a tire circumferential direction or a tire radial direction, being provided at intervals in the tire circumferential direction and having a longitudinal direction inclined relative to the tire circumferential direction, each of the plurality of protrusion portions having an external contour that comprises a plurality of main external contour portions having different curvatures, and a connection portion connecting between the main external contour portions, the external contour projecting from the tire side surface in a cross-sectional shape along a longitudinal direction, wherein the plurality of main external contour portions and the connection portion are formed in a range excluding ranges L0 from each of ends in the longitudinal direction to (L×0.05) with respect to a dimension L of each of the plurality of protrusion portions in the longitudinal direction, and one of the plurality of main external contour portions connecting one of the ranges L0 forms a curvature circle whose center is disposed closer to a tire outer side than the tire side surface, the curvature circle being dented toward a tire inner side.

2. The pneumatic tire according to claim 1, wherein the external contour is formed along a ridge line in the longitudinal direction of each of the plurality of protrusion portions.

3. The pneumatic tire according to claim 1, wherein the external contour is formed along a surface of each of the plurality of protrusion portions.

4. The pneumatic tire according to claim 1, wherein the external contour has the plurality of main external contour portions formed in a range from (L×0.7) to (L×0.9), and the connection portion formed in a range from (L×0) to (L×0.3) with respect to a dimension L of each of the plurality of protrusion portions in the longitudinal direction.

5. The pneumatic tire according to claim 1, wherein when the pneumatic tire is incorporated into a regular rim, inflated to a regular internal pressure, ground to a road surface that is a horizontal surface with a regular load, and rolling on the road surface, in a case where a relative speed U between the tire side portion and the road surface is expressed by U m/s=V×r/Q, a Reynolds number Re is expressed by Re=U× Q/v wherein V is a primary flow velocity m/s opposite to a rolling direction of the pneumatic tire, r is a distance m from the road surface toward a rotation axis, Q is a distance m from the road surface to the rotation axis, and v is a kinematic viscosity of air m²/s, and the primary flow velocity V is 27.8 m/s, each of the plurality of protrusion portions is provided at a position where a range of the Reynolds number Re satisfies $2000<Re<4\times10^5$.

6. The pneumatic tire according to claim 5, wherein a total volume Vo of the plurality of protrusion portions satisfies a range of $1000 \text{ mm}^3 \leq Vo \leq 50000 \text{ mm}^3$ in the range of the Reynolds number Re.

7. The pneumatic tire according to claim 1, wherein each of the plurality of protrusion portions has a highest position of a projection height from the tire side surface of 2 mm or higher and 10 mm or lower.

8. The pneumatic tire according to claim 1, wherein a variation in projection height of each of the plurality of protrusion portions per 1 degree in the tire circumferential direction is 1 mm/deg or less.

9. The pneumatic tire according to claim 1, wherein a variation in mass of each of the plurality of protrusion portions per 1 degree in the tire circumferential direction is 0.1 g/deg or less.

10. The pneumatic tire according to claim 1, wherein the plurality of protrusion portions are disposed at non-uniform intervals in the tire circumferential direction.

11. The pneumatic tire according to claim 1, wherein a vehicle inner/outer side orientation when the pneumatic tire is mounted on a vehicle is designated, and the plurality of protrusion portions are formed on at least a tire side portion corresponding to an outer side of the vehicle.

12. The pneumatic tire according to claim 3, wherein the external contour has the plurality of main external contour portions and the connection portion formed in a range excluding a range from each of ends in the longitudinal direction to (L×0.05) with respect to a dimension L of each of the plurality of protrusion portions in the longitudinal direction.

13. The pneumatic tire according to claim 12, wherein the external contour has the plurality of main external contour portions formed in a range from (L×0.7) to (L×0.9), and the connection portion formed in a range from (L×0) to (L×0.3) with respect to the dimension L of each of the plurality of protrusion portions in the longitudinal direction.

14. The pneumatic tire according to claim 13, wherein when the pneumatic tire is incorporated into a regular rim, inflated to a regular internal pressure, ground to a road surface that is a horizontal surface with a regular load, and rolling on the road surface, in a case where a relative speed U between the tire side portion and the road surface is expressed by U m/s=V×r/Q, a Reynolds number Re is expressed by Re=U×Q/v wherein V is a primary flow velocity m/s opposite to a rolling direction of the pneumatic tire, r is a distance m from the road surface toward a rotation axis, Q is a distance m from the road surface to the rotation axis, and v is a kinematic viscosity of air $m^2/s$, and the primary flow velocity V is 27.8 m/s, each of the plurality of protrusion portions is provided at a position where a range of the Reynolds number Re satisfies $2000 < Re < 4 \times 10^5$.

15. The pneumatic tire according to claim 14, wherein a total volume Vo of the plurality of protrusion portions satisfies a range of 1000 $mm^3 \leq Vo \leq 50000$ $mm^3$ in the range of the Reynolds number Re.

16. The pneumatic tire according to claim 15, wherein each of the plurality of protrusion portions has a highest position of a projection height from the tire side surface of 2 mm or higher and 10 mm or lower.

17. The pneumatic tire according to claim 16, wherein a variation in projection height of each of the plurality of protrusion portions per 1 degree in the tire circumferential direction is 1 mm/deg or less.

18. The pneumatic tire according to claim 17, wherein a variation in mass of each of the plurality of protrusion portions per 1 degree in the tire circumferential direction is 0.1 g/deg or less.

19. The pneumatic tire according to claim 18, wherein:
the plurality of protrusion portions are disposed at non-uniform intervals in the tire circumferential direction;
a vehicle inner/outer side orientation when the pneumatic tire is mounted on a vehicle is designated; and
the plurality of protrusion portions are formed on at least a tire side portion corresponding to an outer side of the vehicle.

20. The pneumatic tire according to claim 1, wherein a projection height of the one of the plurality of main external contour portions gradually decreases from the connection portion toward a connection point with the one of the ranges L0.

21. The pneumatic tire according to claim 1, wherein one of the other of the plurality of main external contour portions connecting to the other of the ranges L0 forms a curvature circle whose center is disposed closer to the tire inner side than the tire side surface the curvature circle bulging toward the tire outer side.

22. The pneumatic tire according to claim 21, wherein the one and other of the plurality of main external contour portions are formed in a range L1 from (L×0.7) to (L×0.9) with respect to a dimension L of each of the plurality of protrusion portions in the longitudinal direction, where the range L1 is defined as a total of ranges of the one and other of the plurality of main external contour portions.

23. A pneumatic tire comprising a plurality of protrusion portions extending along a tire side surface of a tire side portion longitudinally intersecting a tire circumferential direction or a tire radial direction, being provided at intervals in the tire circumferential direction and having a longitudinal direction inclined relative to the tire circumferential direction, each of the plurality of protrusion portions having an external contour that comprises a plurality of main external contour portions having different curvatures, and a connection portion connecting between the main external contour portions, the external contour projecting from the tire side surface in a cross-sectional shape along a longitudinal direction, and the connection portion being formed in a concave shape so as to approach a tire inner side with respect to the tire side surface; wherein the plurality of main external contour portions are formed in a range L1 from (L×0.7) to (L×0.9) with respect to a dimension L of each of the plurality of protrusion portions in the longitudinal direction, where the range L1 is defined as a total of ranges of the plurality of main external contour portions.

24. The pneumatic tire according to claim 23, wherein a projection height of the main external contour portion gradually decreases from the connection portion toward each of longitudinal ends of each of the plurality of protrusions.

25. The pneumatic tire according to claim 23, wherein the plurality of main external contour portions and the connection portion are formed in a range excluding ranges L0 from each of ends in the longitudinal direction to (L×0.05) with respect to a dimension L of each of the plurality of protrusion portions in the longitudinal direction.

* * * * *